(12) United States Patent
Alef et al.

(10) Patent No.: US 11,008,144 B2
(45) Date of Patent: May 18, 2021

(54) CONTAINER PRECURSOR, IN PARTICULAR FOR PRODUCING A DIMENSIONALLY STABLE FOODSTUFF CONTAINER, HAVING A SHEETLIKE COMPOSITE, A FIRST AND A SECOND WALL REGION

(71) Applicant: SIG TECHNOLOGY AG, Neuhausen am Rheinfall (CH)

(72) Inventors: Ulrich Alef, Wegberg (DE); Thomas Schumacher, Aldenhoven (DE); Norbert Peter Herzog, Hückelhoven (DE)

(73) Assignee: SIG TECHNOLOGY AG, Neuhausen am Rheinfall (CH)

( * ) Notice: Subject to any disclaimer, the term of this patent is extended or adjusted under 35 U.S.C. 154(b) by 13 days.

(21) Appl. No.: 16/342,782

(22) PCT Filed: Oct. 16, 2017

(86) PCT No.: PCT/EP2017/076369
§ 371 (c)(1),
(2) Date: Apr. 17, 2019

(87) PCT Pub. No.: WO2018/073183
PCT Pub. Date: Apr. 26, 2018

(65) Prior Publication Data
US 2019/0256264 A1 Aug. 22, 2019

(30) Foreign Application Priority Data

Oct. 17, 2016 (EP) ..................................... 16194221
Nov. 15, 2016 (CN) .......................... 201611022498.7
Nov. 15, 2016 (CN) .......................... 201621226980.8

(51) Int. Cl.
*B65D 65/40* (2006.01)
*B32B 1/02* (2006.01)
(Continued)

(52) U.S. Cl.
CPC .............. *B65D 65/40* (2013.01); *B31B 50/26* (2017.08); *B31B 50/644* (2017.08);
(Continued)

(58) Field of Classification Search
CPC .... B32B 3/04; B32B 3/06; B32B 1/02; B32B 7/022; B32B 7/02; B32B 7/04;
(Continued)

(56) References Cited

U.S. PATENT DOCUMENTS

2017/0129226 A1* 5/2017 Bischoff ............... B32B 27/325

FOREIGN PATENT DOCUMENTS

DE        10252553 A1     6/2004
WO    2016/001081 A1     1/2016
(Continued)

OTHER PUBLICATIONS

Translation of DE10252553, Schibull et al., Jun. 3, 2004, pp. 2-3. (Year: 2004).*
(Continued)

*Primary Examiner* — Robert J Hicks
(74) *Attorney, Agent, or Firm* — Meunier Carlin & Curfman LLC

(57) ABSTRACT

The present invention refers to a container precursor, comprising a composite sheet which comprises
  a) an outer polymer layer,
  b) a colour application,
  c) a carrier layer, and
  d) a barrier layer;
wherein a wall of the container precursor
  comprises a first wall region and a second wall region.
The invention further refers to a closed container, obtainable from the container precursor; and to a closed container having the above composite sheet, the first and the second wall region.

12 Claims, 10 Drawing Sheets

(51) Int. Cl.
  *B32B 7/12*   (2006.01)
  *B31B 50/74*  (2017.01)
  *B31B 50/64*  (2017.01)
  *B31B 50/26*  (2017.01)
  *B32B 3/04*   (2006.01)
  *B32B 15/085* (2006.01)
  *B32B 15/20*  (2006.01)
  *B65D 5/06*   (2006.01)
  *B65D 5/42*   (2006.01)
  *B32B 7/02*   (2019.01)
  *B32B 27/10*  (2006.01)
  *B32B 15/12*  (2006.01)
  *B32B 1/08*   (2006.01)
  *B32B 7/05*   (2019.01)
  *B32B 3/10*   (2006.01)
  *B32B 3/26*   (2006.01)
  *B32B 3/06*   (2006.01)
  *B32B 7/04*   (2019.01)
  *B31B 120/40* (2017.01)
  *B31B 110/35* (2017.01)
  *B31B 50/84*  (2017.01)
  *B31B 105/00* (2017.01)

(52) U.S. Cl.
  CPC .............. *B31B 50/742* (2017.08); *B32B 1/02* (2013.01); *B32B 1/08* (2013.01); *B32B 3/04* (2013.01); *B32B 3/06* (2013.01); *B32B 3/10* (2013.01); *B32B 3/263* (2013.01); *B32B 7/02* (2013.01); *B32B 7/04* (2013.01); *B32B 7/05* (2019.01); *B32B 7/12* (2013.01); *B32B 15/085* (2013.01); *B32B 15/12* (2013.01); *B32B 15/20* (2013.01); *B32B 27/10* (2013.01); *B65D 5/064* (2013.01); *B65D 5/4279* (2013.01); *B31B 50/64* (2017.08); *B31B 50/84* (2017.08); *B31B 2105/001* (2017.08); *B31B 2105/0022* (2017.08); *B31B 2110/35* (2017.08); *B31B 2120/40* (2017.08); *B32B 2250/05* (2013.01); *B32B 2250/42* (2013.01); *B32B 2250/44* (2013.01); *B32B 2255/10* (2013.01); *B32B 2255/26* (2013.01); *B32B 2307/402* (2013.01); *B32B 2307/404* (2013.01); *B32B 2307/4023* (2013.01); *B32B 2307/7242* (2013.01); *B32B 2307/7244* (2013.01); *B32B 2307/7246* (2013.01); *B32B 2307/7248* (2013.01); *B32B 2307/7265* (2013.01); *B32B 2439/40* (2013.01); *B32B 2439/62* (2013.01); *B32B 2439/70* (2013.01)

(58) Field of Classification Search
  CPC ......... B32B 7/08; B32B 15/085; B32B 15/08; B32B 15/04; B32B 15/12; B32B 15/20; B29C 53/04; B65B 7/16; B65B 43/10; B65B 55/04; B65D 5/06; B65D 5/4279; B65D 5/563; B65D 5/56
  USPC ...... 220/62.17, 62.15, 62.11; 229/5.84, 5.81, 229/103.1; 493/52; 428/41.1, 34.2, 328
  See application file for complete search history.

(56) References Cited

FOREIGN PATENT DOCUMENTS

| WO | 2016/066593 A1 | 5/2016 |
| WO | 2016066592 A1 | 5/2016 |

OTHER PUBLICATIONS

PCT/EP2017/076369, International Search Report and Written Opinion dated Jan. 15, 2018.

* cited by examiner

Figure 5
500
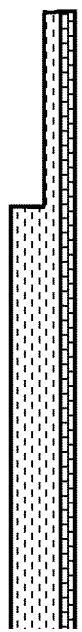
a)
105
107
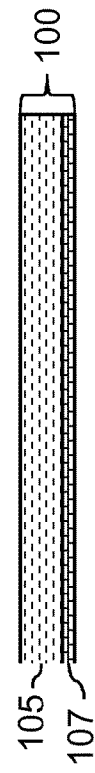
c)
e)
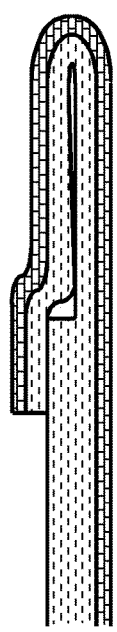
b)
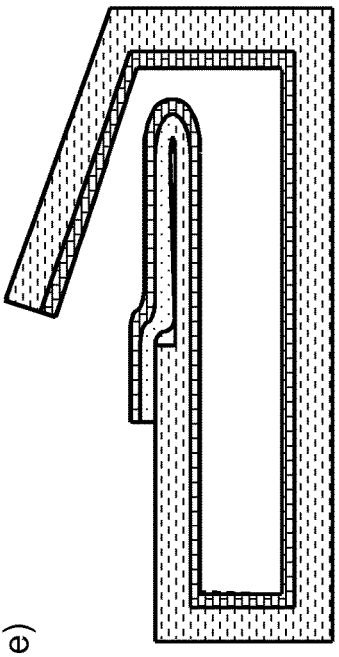
d)
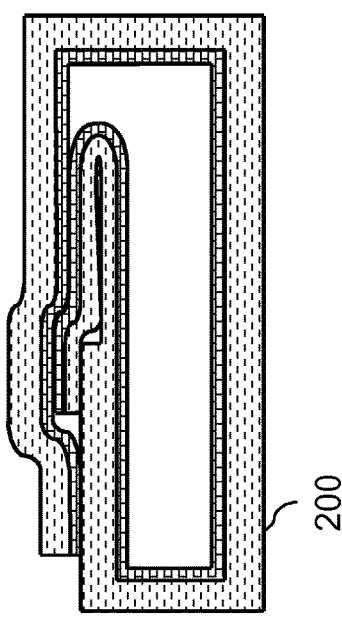
f)
200

700

700

CONTAINER PRECURSOR, IN PARTICULAR FOR PRODUCING A DIMENSIONALLY STABLE FOODSTUFF CONTAINER, HAVING A SHEETLIKE COMPOSITE, A FIRST AND A SECOND WALL REGION

The present invention refers to a container precursor, comprising a sheetlike composite; wherein the sheetlike composite comprises as a layer sequence in a direction from an outer surface of the sheetlike composite to an inner surface of the sheetlike composite
  a) an outer polymer layer,
  b) a colour application,
  c) a carrier layer, and
  d) a barrier layer;
wherein the sheetlike composite forms a wall of the container precursor; wherein the wall
  a. at least partly surrounds an interior of the container precursor, and
  b. comprises a first wall region and a second wall region;
wherein the first wall region partly comprises as a layer sequence from the interior outwards a first ply, a second ply, and a third ply, in each case of the sheetlike composite; wherein in the first wall region the first ply is bonded to the second ply and the second ply is bonded to the third ply; wherein the second wall region partly comprises as a layer sequence from the interior outwards the first ply, the second ply, and the third ply, in each case of the sheetlike composite; wherein in the second wall region the second ply is bonded to the third ply; wherein at least the carrier layer and the barrier layer extend into the first ply, the second ply, and the third ply; wherein in the first wall region: in the second ply a layer thickness of the carrier layer is less than in the first ply, or in the third ply, or in both; wherein in the second wall region: in the third ply a layer thickness of the carrier layer is more than in the first ply, or in the second ply, or in both. The invention further refers to a closed container, obtainable from the container precursor; and to a closed container having the above sheetlike composite, the first and the second wall region.

For some time, foodstuffs have been preserved, whether they be foodstuffs for human consumption or else animal feed products, by storing them either in a can or in a jar closed by a lid. In this case, shelf life can be increased firstly by separately and very substantially sterilising the foodstuff and the container in each case, here the jar or can, and then introducing the foodstuff into the container and closing the container. However, these measures of increasing the shelf life of foodstuffs, which have been tried and tested over a long period, have a series of disadvantages, for example the need for another sterilisation later on. Cans and jars, because of their essentially cylindrical shape, have the disadvantage that very dense and space-saving storage is not possible. Moreover, cans and jars have considerable intrinsic weight, which leads to increased energy expenditure in transport. Moreover, production of glass, tinplate or aluminium, even when the raw materials used for the purpose are recycled, necessitates quite a high expenditure of energy. In the case of jars, an aggravating factor is elevated expenditure on transport. The jars are usually prefabricated in a glass factory and then have to be transported to the facility where the foodstuff is dispensed with utilisation of considerable transport volumes. Furthermore, jars and cans can be opened only with considerable expenditure of force or with the aid of tools and hence in a rather laborious manner. In the case of cans, there is a high risk of injury emanating from sharp edges that arise on opening. In the case of jars, it is a repeated occurrence that broken glass gets into the foodstuff in the course of filling or opening of the filled jars, which can lead in the worst case to internal injuries on consumption of the food-stuff. In addition, both cans and jars have to be labelled for identification and promotion of the foodstuff contents. The jars and cans cannot be printed directly with information and promotional messages. In addition to the actual printing, a substrate is thus needed for the purpose, a paper or suitable film, as is a securing means, an adhesive or sealant.

Other packaging systems are known from the prior art, in order to store foodstuffs over a long period with minimum impairment. These are containers produced from sheetlike composites—frequently also referred to as laminates. Sheetlike composites of this kind are frequently constructed from a thermoplastic plastic layer, a carrier layer usually consisting of cardboard or paper which imparts dimensional stability to the container, an adhesion promoter layer, a barrier layer and a further plastic layer, as disclosed inter alia in WO 90/09926 A2. As the carrier layer imparts rigidity and dimensional stability to the container produced from the laminate, these laminate containers are to be seen in a line of development with the above mentioned glasses and jars. In this the above mentioned laminate containers differ severely from pouches and bags produced from thin foils without carrier layer.

The laminate containers of the prior art already have many advantages over the conventional jars and cans. Nevertheless, there are improvement opportunities even in the case of these packaging systems. Laminate containers are frequently characterised in that they consist of a laminate which has been folded several times, with opposite ends of the laminate being sealed one on top of the other to form, in the first instance, a shell- or tube-shaped precursor of a closed container. The end areas sealed one on top of the other form a longitudinal seam, which is also present in the closed container. Both on the inside and on the outside of the container this longitudinal seam comprises a joint of the laminate through which moisture can penetrate into the layer structure of the laminate, in particular the carrier layer consisting usually of cardboard or paperboard. This must be prevented, at least on the inside of the longitudinal seam, because the container is designed to contain foodstuff having a content of water. In the prior art, a polymer sealing strip is therefore sealed on the inside along the length of the longitudinal seam. Such a sealing strip constitutes an additional component to be applied in the manufacturing process of the container. Further, the sealing strip must be sealable. Thus it cannot, unlike the normal barrier layer, consist merely of an aluminium layer. In order to achieve a barrier effect in the sealing strip, the sealing strip of the state of the art often consists of a sealable plastic with a barrier effect, such as an EVOH layer. However, such a plastic, which is capable of forming a barrier, is relatively expensive, which increases the production costs of the container. Also, the seal of the sealing strip must be totally impermeable over the entire length of the longitudinal seam so as to be able to prevent the ingress of moisture, as the seal and hence a seam along the entire length of the longitudinal seam on either side of the sealing strip faces the inside and hence the food.

In general terms, it is an object of the present invention to at least partly overcome at least one disadvantage which arises from the prior art. A further object of the invention is to provide a container or a container precursor or both, wherein a process for manufacturing the container or the container precursor is selected from a group consisting of a process that needs less time, or is cheaper, or requires fewer components, or a combination of at least two thereof. A further object of the invention is to provide a container that is more stable against compression. A further object of the invention is to provide a container that can be manufactured with a lower reject rate. A further object of the invention is to provide a container or a container precursor or both, wherein the container or the container precursor, contains no additional barrier strip to seal the container on the inside. A further object of the invention is to provide a container or a container precursor or both, wherein a process for manufacturing the container or the container precursor is characterised by one selected from a group consisting of a process involving less dust formation, or less noise generation, or longer service life of the cutting tool, or a combination of at least two thereof. A further object of the invention is to provide a container or a container precursor or both, wherein there is as little additional bonding material, for example a sealing layer or an adhesive, as possible between superimposed skived areas of a carrier material of the container or the container precursor. A further object of the invention is to provide a container or a container precursor or both, wherein there is a greater choice of layer thickness of a skived carrier layer of the container or the container precursor. A further object of the invention is to provide a container or a container precursor or both, wherein a seam, preferably a longitudinal seam, of the container or of the container precursor is as good as possible protected against the ingress of moisture on the inside or on the outside or both. A further object of the invention is to provide a container, wherein the container's bacterial count is lower for the same amount of sterilisation. A further object of the invention is to provide a container or a container precursor or both, which can be produced with increased process stability. A further object of the invention is to provide a container or a container precursor or both, which can be produced with a lower production tolerance in connection with a seam, preferably a low variation in seam width. A further object of the invention is to provide a container, wherein the container possesses a combination of 2 or more of the abovementioned advantages.

A contribution to at least partial achievement of at least one of the above objects is made by the independent claims. The dependent claims provide preferred embodiments which contribute to at least partial achievement of at least one of the objects.

A contribution to the achievement of at least one of the objects of the invention is made by an embodiment 1 of a container precursor, comprising a sheetlike composite; wherein the sheet-like composite comprises as a layer sequence in a direction from an outer surface of the sheetlike composite to an inner surface of the sheetlike composite
   a) an outer polymer layer,
   b) a colour application,
   c) a carrier layer, and
   d) a barrier layer;
wherein the sheetlike composite forms a wall of the container precursor; wherein the wall
   a. at least partly surrounds an interior of the container precursor, and
   b. comprises a first wall region and a second wall region; wherein the first wall region partly comprises as a layer sequence from the interior outwards a first ply, a second ply, and a third ply, in each case of the sheetlike composite; wherein in the first wall region the first ply is bonded to the second ply and the second ply is bonded to the third ply; wherein the second wall region partly comprises as a layer sequence from the interior outwards the first ply, the second ply, and the third ply, in each case of the sheetlike composite; wherein in the second wall region the second ply is bonded to the third ply; wherein at least the carrier layer and the barrier layer extend into the first ply, the second ply, and the third ply; wherein in the first wall region: in the second ply a layer thickness of the carrier layer is less than in the first ply, or in the third ply, or in both; wherein in the second wall region: in the third ply a layer thickness of the carrier layer is more than in the first ply, or in the second ply, or in both. Preferably, in the container precursor the inner surface of the sheetlike composite predominantly faces the interior of the container precursor, based on an overall surface area of the inner surface.

In an embodiment 2 according to the invention, the container precursor is configured according to the embodiment 1, wherein in the first ply the inner surface of the sheetlike composite faces towards the interior; wherein in the second ply the inner surface of the sheetlike composite faces away from the interior; wherein in the third ply the inner surface of the sheetlike composite faces towards the interior.

In an embodiment 3 according to the invention, the container precursor is configured according to the embodiment 1 or 2, wherein in the first wall region the outer polymer layer and the colour application each do not extend into the second ply.

In an embodiment 4 according to the invention, the container precursor is configured according to any of the embodiments 1 to 3, wherein in the first wall region, or in the second wall region, or in both the outer polymer layer and the colour application each extend into the third ply. In the first wall region the outer polymer layer may or may not extend into the first ply, wherein the outer polymer layer preferably extends into the first ply.

In an embodiment 5 according to the invention, the container precursor is configured according to any of the embodiments 1 to 4, wherein in the second wall region the outer polymer layer and the colour application do not extend into the first ply, or into the second ply, or into both.

In an embodiment 6 according to the invention, the container precursor is configured according to any of the embodiments 1 to 5, wherein the first wall region abuts against the second wall region.

In an embodiment 7 according to the invention, the container precursor is configured according to any of the embodiments 1 to 6, wherein the first wall region has a first width along a circumference of the container precursor, wherein the first width is in the range from 1 to 6 mm, preferably from 1 to 5 mm, more preferably from 1 to 4 mm, most preferably from 1 to 3 mm.

In an embodiment 8 according to the invention, the container precursor is configured according to any of the embodiments 1 to 7, wherein the second wall region has a second width along a circumference of the container precursor, wherein the second width is in the range from 1 to 10 mm, preferably from 1 to 9 mm, more preferably from 1 to 8 mm, more preferably from 1 to 7 mm, more preferably from 1 to 6 mm, more preferably from 1 to 5 mm, more preferably from 1 to 4 mm, most preferably from 1 to 3 mm.

In an embodiment 9 according to the invention, the container precursor is configured according to any of the embodiments 1 to 8, wherein in the first wall region: the layer thickness of the carrier layer in the second ply is 0.05 to 0.9 times, preferably 0.1 to 0.85 times, more preferably 0.2 to 0.85 times, more preferably 0.3 to 0.85 times, more preferably 0.4 to 0.85 times, still more preferably 0.5 to 0.8 times, most preferably 0.6 to 0.75 times, the layer thickness of the carrier layer in the first ply, or in the third ply, or in both.

In an embodiment 10 according to the invention, the container precursor is configured according to any of the embodiments 1 to 9, wherein in the second wall region: the layer thickness of the carrier layer in the third ply is 1.1 to 20 times, preferably 1.1 to 15 times, more preferably 1.1 to 10 times, more preferably 1.1 to 5 times, more preferably 1.1 to 3 times, more preferably 1.1 to 2 times, more preferably 1.2 to 1.9 times, still more preferably 1.2 to 1.8 times, most preferably 1.3 to 1.7 times, the layer thickness of the carrier layer in the first ply, or in the sec- and ply, or in both.

In an embodiment 11 according to the invention, the container precursor is configured according to any of the embodiments 1 to 10, wherein in the second wall region the first ply is not bonded to the second ply. The first ply is preferably in contact with, but not bonded to, the second ply in the second wall region. In the second wall region, preferably at least 20%, more preferably at least 30%, more preferably at least 40%, more preferably at least 50%, more preferably at least 60%, more preferably at least 70%, still more preferably at least 80%, still more preferably at least 90%, most preferably at least 95%, of a surface of the first ply facing the second ply is in contact with, and preferably not bonded to, the second ply. Also, the first ply and the second ply are preferably held together in such a way that they are joined together in at least one wall region, preferably the first wall region, abutting the second wall region. In the second wall region, the first ply may be neither bonded to nor in contact with the second ply in a further embodiment. In a further embodiment of the invention, the first ply and the second ply are bonded together in the second wall region preferably on at least 20%, more preferably on at least 30%, more preferably on at least 40%, more preferably on at least 50%, more preferably on at least 60%, more preferably on at least 70%, still more preferably on at least 80%, still more preferably on at least 90%, most preferably on at least 95%, of a surface of the first ply facing the second ply. The first ply and the second ply in the second wall region are preferably pressed together, or sealed together, or both.

In an embodiment 12 according to the invention, the container precursor is configured according to any of the embodiments 1 to 11, wherein in the second wall region
a) a surface of the carrier layer in the first ply facing towards the second ply, and
b) a surface of the carrier layer in the second ply facing towards the first ply,
do not comprise a cover layer, preferably not a "coating", and are not bonded to a cover layer, preferably not to a "coating".

In an embodiment 13 according to the invention, the container precursor is configured according to any of the embodiments 1 to 12, wherein in the first wall region: a surface of the carrier layer in the second ply facing towards the first ply does not comprise a cover layer, preferably not a "coating", and is not bonded to a cover layer, preferably not to a "coating".

In an embodiment 14 according to the invention, the container precursor is configured according to any of the embodiments 1 to 13, wherein the wall comprises a third wall region; wherein the third wall region partly comprises as a layer sequence from the interior outwards the first ply, and the third ply, in each case of the sheetlike composite; wherein in the third wall region the first ply is bonded to the third ply; wherein the third wall region abuts against the first wall region.

In an embodiment 15 according to the invention, the container precursor is configured according to the embodiment 14, wherein the third wall region has a third width along a circumference of the container precursor, wherein the third width is in the range from 1 to 12 mm, preferably from 1 to 11 mm, more preferably from 1 to 10 mm, more preferably from 1 to 9 mm, more preferably from 1 to 8 mm, more preferably from 1 to 7 mm, most preferably from 1 to 6 mm.

In an embodiment 16 according to the invention, the container precursor is configured according to any of the embodiments 1 to 15, wherein the outer polymer layer is an outermost layer of the sheetlike composite. Preferably, in each single ply of the sheetlike composite no layer of the sheetlike composite superimposes the outer polymer layer on a side of the outer polymer layer which faces away from the carrier layer.

In an embodiment 17 according to the invention, the container precursor is configured according to any of the embodiments 1 to 16, wherein the colour application adjoins the carrier layer. Hence, according to this preferred embodiment, there is no layer present between the colour application and the carrier layer.

In an embodiment 18 according to the invention, the container precursor is configured according to any of the embodiments 1 to 17, wherein the carrier layer includes, preferably consists of, one selected from the group consisting of paperboard, cardboard, and paper, or a combination of at least two thereof. The terms "paper", "paperboard" and "cardboard" are used herein in accordance with the definitions in the standard DIN 6735:2010. In addition, cardboard is preferably a material which shows a mixture of features of paper and paperboard. Further, cardboard preferably has a grammage in the range from 150 to 600 $g/m^2$.

In an embodiment 19 according to the invention, the container precursor is configured according to any of the embodiments 1 to 18, wherein the colour application comprises at least 4 wt.-%, preferably at least 6 wt.-%, more preferably at least 8 wt.-%, in each case of at least one colourant, based on the weight of the colour application.

In an embodiment 20 according to the invention, the container precursor is configured according to any of the embodiments 1 to 19, wherein the outer polymer layer comprises at least 50 wt.-%, preferably at least 75 wt.-%, more preferably at least 80 wt.-%, of a polyethylene, in each case based on the weight of the outer polymer layer.

In an embodiment 21 according to the invention, the sheetlike composite is configured according to any of the embodiments 1 to 20, wherein the colour application comprises at least 10 wt.-%, preferably at least 15 wt.-%, more preferably at least 20 wt.-%, of a styrene copolymer, in each case based on the weight of the colour application. A preferred styrene copolymer is a styrene acrylate copolymer.

In an embodiment 22 according to the invention, the sheetlike composite is configured according to any of the embodiments 1 to 20, wherein the colour application comprises at least 5 wt.-%, preferably at least 10 wt.-%, more preferably at least 15 wt.-%, of a polyvinyl butyral, in each case based on the weight of the colour application.

In an embodiment 23 according to the invention, the sheetlike composite is configured according to any of the embodiments 1 to 20, wherein the colour application comprises at least 10 wt.-%, preferably at least 15 wt.-%, more preferably at least 20 wt.-%, of nitrocellulose, in each case based on the weight of the colour application.

In an embodiment 24 according to the invention, the container precursor is configured according to any of the embodiments 1 to 23, wherein the first wall region and the second wall region each are comprised by a longitudinal seam of the container precursor. Preferably, the first wall region, the second wall region, and the third wall region each are comprised by the longitudinal seam of the container precursor. Preferably, the sheetlike composite comprises a first longitudinal rim and a further longitudinal rim, wherein the first longitudinal rim is joined to the further longitudinal rim, forming the longitudinal seam of the container precursor. The first and the further longitudinal rims are preferably positioned on opposite ends of the sheetlike composite across the outer surface or the inner surface or both of the sheetlike composite.

A contribution to the achievement of at least one of the objects of the invention is made by an embodiment 1 of a closed container 1, obtainable from the container precursor according to any of its embodiments 1 to 24. The closed container preferably comprises a foodstuff. Preferably, obtaining the closed container from the container precursor comprises folding the sheet-like composite and closing the container precursor with a closing tool.

A contribution to the achievement of at least one of the objects of the invention is made by an embodiment 1 of a closed container 2, comprising a sheetlike composite; wherein the sheetlike composite comprises as a layer sequence in a direction from an outer surface of the sheetlike composite to an inner surface of the sheetlike composite
  a) an outer polymer layer,
  b) a colour application,
  c) a carrier layer, and
  d) a barrier layer;
wherein the sheetlike composite forms a wall of the container precursor; wherein the wall
  a. at least partly surrounds an interior of the container precursor, and
  b. comprises a first wall region and a second wall region;
wherein the first wall region partly comprises as a layer sequence from the interior outwards a first ply, a second ply, and a third ply, in each case of the sheetlike composite; wherein in the first wall region the first ply is bonded to the second ply and the second ply is bonded to the third ply; wherein the second wall region partly comprises as a layer sequence from the interior outwards the first ply, the second ply, and the third ply, in each case of the sheetlike composite; wherein in the second wall region the second ply is bonded to the third ply; wherein at least the carrier layer and the barrier layer extend into the first ply, the second ply, and the third ply; wherein in the first wall region: in the second ply a layer thickness of the carrier layer is less than in the first ply, or in the third ply, or in both; wherein in the second wall region: in the third ply a layer thickness of the carrier layer is more than in the first ply, or in the second ply, or in both. In preferred embodiments of the closed container, one selected from the group consisting of the first wall region, the second wall region, and the third wall region, or a combination of at least two thereof is designed according to any of the embodiments of the container precursor. Further, the sheetlike composite and any of its layers in the closed container according to the invention is preferably designed according to any of the embodiments of the container precursor. Hence, the features of the preferred embodiments of the container precursor analogously apply in preferred embodiments of the closed container according to the invention.

A contribution to the achievement of at least one of the objects of the invention is made by an embodiment 1 of a closed container 3, comprising a sheetlike composite; wherein the sheetlike composite comprises as a layer sequence in a direction from an outer surface of the sheetlike composite to an inner surface of the sheetlike composite
  a) an outer polymer layer,
  b) a colour application,
  c) a carrier layer, and
  d) a barrier layer;
wherein the sheetlike composite forms a wall of the closed container; wherein the wall
  a. at least partly surrounds an interior of the closed container, and
  b. comprises a first wall region and a second wall region;
wherein the first wall region partly comprises as a layer sequence from the interior outwards a first ply, a second ply, and a third ply, in each case of the sheetlike composite; wherein in the first wall region the first ply is bonded to the second ply and the second ply is bonded to the third ply; wherein the second wall region partly comprises as a layer sequence from the interior outwards the first ply, the second ply, and the third ply, in each case of the sheetlike composite; wherein in the second wall region the second ply is bonded to the third ply; wherein at least the carrier layer and the barrier layer extend into the first ply, the second ply, and the third ply; wherein in the first wall region: in the second ply a layer thickness of the carrier layer is less than in the first ply, or in the third ply, or in both; wherein in the second wall region: in the third ply a layer thickness of the carrier layer is more than in the first ply, or in the second ply, or in both. In preferred embodiments of the closed container, one selected from the group consisting of the first wall region, the second wall region, and the third wall region, or a combination of at least two thereof is designed according to any of the embodiments of the container precursor. Further, the sheetlike composite and any of its layers in the closed container according to the invention is preferably designed according to any of the embodiments of the container precursor. Hence, the features of the preferred embodiments of the container precursor analogously apply in preferred embodiments of the closed container according to the invention.

Colour Application

Generally, a colour application is a solid material on a surface, wherein the solid material comprises at least one colourant. Therein, the colour application may be continuous or discontinuous. If the colour application is discontinuous, it preferably has a surface coverage of less than 100%. According to DIN 55943:2001-10, colourant is the collective term for all colouring substances, especially for dyes and pigments. A preferred colourant is a pigment. A preferred pigment is an inorganic pigment or an organic pigment or both, wherein the organic pigment is particularly preferred. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9). However, other pigments may be considered as well. For example, the following are further notable suitable pigments:
  i. red or magenta pigments: pigment red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, pigment violet 3, 19, 23, 29, 30, 37, 50 and 88;
  ii. blue or cyan pigments: pigment blue 1, 15, 15:1, 15:2, 15:3, 15:4, 15:6, 16, 17-1, 22, 27, 28, 29, 36 and 60;

iii. green pigments: pigment green 7, 26, 36 and 50;
iv. yellow pigments: pigment yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185 and 193 and
v. white pigments: pigment white 6, 18 and 21.

The colour application preferably comprises one or more colourants in a total proportion of 1 to 60% by weight, preferably 3 to 55% by weight in total, more preferably of 5 to 52% by weight in total, most preferably of 7 to 50% by weight in total, based in each case on the weight of colour application.

The colour application preferably comprises at least 2 colourants, more preferably at least 3 colourants, more preferably at least 4 colourants, even more preferably at least 5, most preferably at least 6 colourants. In a preferred embodiment, the colour application comprises exactly 4 colourants or exactly 6 colourants. A preferred colour application is a decoration or comprises a plurality of decorations, preferably a plurality of identical decorations. A preferred decoration is a decoration of a container, preferably a foodstuff container, to be produced from the sheetlike composite. A preferred decoration comprises information for identification and/or promotion of a foodstuff, preferably the foodstuff to be stored in a container, to be produced from the sheetlike composite.

A preferred colour application comprises a polyvinyl acetal in a proportion of at least 10% by weight, preferably at least 15% by weight, more preferably at least 20% by weight, more preferably at least 30% by weight, most preferably at least 40% by weight, based in each case on the weight of the colour application. The polyvinyl acetal preferably works as a binder in the colour application, which has preferably been obtained from an ink by hardening this ink.

Another preferred colour application comprises nitrocelluse in a proportion in the range from 10 to 90% by weight, preferably from 20 to 90% by weight, more preferably from 30 to 90% by weight, more preferably from 40 to 80% by weight, most preferably from 45 to 75% by weight, based in each case on the weight of the colour application. The nitrocelluse preferably works as a binder in the colour application, which has preferably been obtained from an ink by hardening this ink.

Yet another preferred colour application comprises a styrene copolymer in a proportion in the range from 5 to 50% by weight, preferably from 5 to 40% by weight, more preferably from 10 to 40% by weight, more preferably from 15 to 40% by weight, most preferably from 20 to 30% by weight, based in each case on the weight of the colour application. A preferred styrene copolymer is a styrene acrylate copolymer. Preferably, the styrene acrylate copolymer has a high acid to allow for dispersing a pigment. The styrene copolymer preferably works as a binder in the colour application, which has preferably been obtained from an ink by hardening this ink.

Each preferred colour application may further comprise one selected from the group consisting of an antimicrobial agent, a further binder, an anti foaming agent, a stiffening agent, a wax, a rheology agent, and a pH-adjustment agent, or a combination of at least two thereof.

Polyvinyl Acetal

Polyvinyl acetals are thermoplastics which are prepared by reaction of polyvinyl alcohol with aldehydes or ketones. According to the aldehyde used, for example formaldehyde, acetaldehyde or butyraldehyde, a distinction is made between various polyvinyl acetals. Preferred polyvinyl acetals are polyvinyl formal and polyvinyl butyral. A particularly preferred polyvinyl acetal is polyvinyl butyral (PVB).

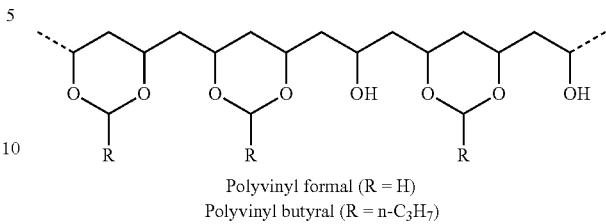

Polyvinyl formal (R = H)
Polyvinyl butyral (R = n-$C_3H_7$)

Outer Surface

The outer surface of the sheetlike composite is a surface of the sheetlike composite which is intended to be in contact with the environment of the container to be produced from the sheetlike composite. This does not mean that, in individual regions of the container, outer surfaces of various regions of the composite are not folded against one another or joined to one another, for example sealed to one another.

Inner Surface

The inner surface of the sheetlike composite is a surface of the sheetlike composite which is intended to be in contact with the contents of the container, preferably a foodstuff, in a container to be produced from the sheetlike composite.

Layers

Two layers are bonded to each other when their adhesion to each other goes beyond van der Waals attraction forces. Layers that are bonded together are preferably sealed together, or glued together, or pressure-bonded together, or bonded through a combination of two or more of these measures. Unless otherwise stated, the layers in a layer sequence can follow one another indirectly, i.e. with one or at least two intermediate layers, or directly, i.e. without intermediate layer. This is in particular the case with wording wherein there is a layer superimposed on another layer. Wording wherein a layer sequence includes a list of layers means that at least the stated layers are present in the stated sequence. This wording does not necessarily mean that these layers follow one another directly. Wording wherein two layers are adjoin one another means that these two layers follow one another directly, and therefore without any intermediate layer. Therein, it is feasible that the colour application is embedded in the outer polymer layer. Hence, there may be regions of the sheetlike composite in which the outer polymer layer adjoins the carrier layer and regions in which the colour application adjoins the carrier layer. However, if the colour application adjoins the carrier layer, the outer polymer layer does not extend between the colour application and the carrier layer. Further, the outer polymer layer preferably completely covers the colour application towards the outer surface of the sheetlike composite. A wording in which two regions abut against each other means that these two regions are in immediate succession without any intermediate region.

Bonding

Bonding is preferably selected from the group consisting of sealing, gluing and pressure-bonding, or a combination of at least two thereof. In the case of sealing, the bond is created by means of a liquid and its solidification. In the case of gluing, chemical bonds form between the interfaces or surfaces of the two objects to be bonded together, which create the bond. In the case of sealing or gluing, it is frequently advantageous to press together the surfaces to be sealed or glued. A preferred form of pressure bonding two layers is to press together a first surface of a first of the two layers onto a second layer facing the first layer of the second of the two layers over at least 20%, preferably at least 30%, more preferably at least 40%, more preferably at least 50%, more preferably at least 60%, more preferably at least 70%, still more preferably at least 80%, still more preferably at least 90%, most preferably at least 95%, of the first surface. Sealing preferably comprises the process steps of heating, laying one on top of the other, and pressing, wherein the process steps preferably follow each other in this sequence. Another sequence is also conceivable, in particular the sequence of laying the layers one on top of the other, heating, and pressing. Preferential heating is heating of a polymer layer, preferably a thermoplastic layer, more preferably a polyethylene layer, or a polypropylene layer, or both. A further preferred form of heating is heating of a polyethylene layer to a temperature of between 80 and 140° C., more preferably between 90 and 130° C., most preferably between 100 and 120° C. A further preferred form of heating is heating of a polypropylene layer to a temperature of between 120 and 200° C., more preferably between 130 and 180° C., most preferably between 140 and 170° C. A further preferred form of heating is carried out to a seal temperature of the polymer layer. A preferred form of heating may be carried out by exposure to radiation, by exposure to a hot gas, by contact to a hot solid, by mechanical vibrations, or by a combination of at least two of these measures. A particularly preferred form of heating is carried out through the excitation of an ultrasound vibration.

Carrier Layer

Material used as carrier layer can be any suitable material which is known to the person skilled in the art for this purpose and which has strength and stiffness sufficient to provide the container with stability to such an extent that the container in essence retains its shape in the presence of its contents. This document also uses the term dimensionally stable to describe a container of this type. In particular, bags and containers made of foils without carrier layer are not dimensionally stable. Preferred materials for the carrier layer are not only several plastics but also plant-based fibre materials, in particular chemical pulps, preferably glued, bleached and/or unbleached chemical pulps, particular preference being given here to paper, cardboard and paperboard. The weight per unit area of the carrier layer is preferably in the range from 120 to 450 g/m$^2$, particularly preferably in the range from 130 to 400 g/m$^2$ and most preferably in the range from 150 to 380 g/m$^2$. A preferred paperboard or cardboard generally has a single- or multilayer structure and can have been coated on one or both sides with one or more covering layers. The residual moisture content of a preferred paperboard or cardboard is moreover less than 20% by weight, preferably from 2 to 15% by weight and particularly preferably from 4 to 10% by weight, based on the total weight of the paperboard or cardboard respectively. A particularly preferred paperboard or cardboard has a multilayer structure. In general, it is further preferable that the paperboard or cardboard has, on the surface facing towards the environment, at least one, but particularly preferably at least two, covering layers as sublayers known to the person skilled in the art as "paper coating". The Scott Bond value of a preferred paperboard or cardboard is moreover in the range from 100 to 360 J/m$^2$, preferably from 120 to 350 J/m$^2$ and particularly preferably from 135 to 310 J/m$^2$. Use of the above-mentioned ranges allows provision of a composite from which it is easily possible to fold a highly leakproof container with narrow tolerances. A preferred carrier layer includes on at least one surface, preferably on each of two mutually opposite surfaces, a covering layer. Except where this is expressly excluded, it is preferable that each carrier layer includes a covering layer on each surface. It is preferable that the carrier layer is of one-piece design.

The carrier layer has a bending resistance which can be determined as provided in the test method below. In a first direction, the carrier layer preferably has a bending resistance in the range from 70 to 700 mN·m, more preferably from 80 to 650 mN·m. In the case of a carrier layer having a plurality of fibres, the first direction is preferably a direction of orientation of the fibres. In the field of paper and cardboard making this direction of orientation of fibres is also known as running direction. In a second direction which is perpendicular to the first direction, a carrier layer having a plurality of fibres further preferably has bending resistance in the range from 10 to 350 mN·m, more preferably from 20 to 300 mN·m. A preferred sheetlike composite having the carrier layer is characterised by a bending resistance in the first direction in the range from 50 to 800 mN·m, more preferably from 50 to 750 mN·m. Further preferably, this sheetlike composite has a bending resistance in the second direction in the range from 50 to 750 mN·m, more preferably from 100 to 700 mN·m.

Cover Layer

A preferred cover layer is a "coating". In paper manufacturing, a "coating" is a cover layer which comprises inorganic solid particles, preferably pigments and additives. The "coating" is preferably applied as a liquid phase, preferably as a suspension or a dispersion, to a surface of a layer containing paper, paperboard or cardboard. A preferred dispersion is an aqueous dispersion. A preferred suspension is an aqueous suspension. A further preferred liquid phase comprises inorganic solid particles, preferably pigments, a binder, and an additive. In this context, a preferred pigment is one selected from the group consisting of calcium carbonate, kaolin, talc, silicate, a plastic pigment, and titanium oxide. A preferred kaolin is calcinated kaolin. A preferred calcium carbonate is one selected from a group consisting of marble, chalk and a precipitated calcium carbonate (PCC) or a combination of at least two thereof. A preferred silicate is a layer silicate. A preferred plastic pigment is spherical, preferably in the shape of a hollow sphere. A preferred binder is one selected from the group consisting of styrene-butadiene, acrylate, acrylonitrile, starch and polyvinyl alcohol or a combination of at least two thereof, wherein acrylate is preferred. A preferred starch is one selected from the group consisting of cationically modified, anionically modified, and fragmented, or a combination of at least two thereof. A preferred additive is one selected from the group consisting of a rheology modifier, a shading dye, an optical brightener, a carrier for an optical brightener, a flocculent, a deaerating agent, and a surface energy modifier, or a combination of at least two thereof. A preferred deaerating agent is a coating colour deaerating agent, preferably based on silicone or on fatty acids, or both. A preferred surface energy modifier is a surfactant.

Barrier Layer

Material used as barrier layer can be any material which is known for this purpose to the person skilled in the art and which exhibits adequate barrier action in particular in relation to oxygen. It is preferable that the barrier layer is selected from a. a plastics barrier layer;
   b. a metal layer;
   c. a metal oxide layer; or
   d. a combination of at least two of a. to c.

It is preferable that the barrier layer is of one-piece design. If, according to alternative a., a barrier layer is a plastics barrier layer, this preferably includes at least 70% by weight, particularly at least 80% by weight and most preferably at least 95% by weight, of at least one plastic which is known for this purpose to the person skilled in the art, in particular on account of aroma properties or, respectively, gas-barrier properties that are suitable for packaging containers. Plastics, in particular thermoplastics, that can be used here are N- or O-containing plastics, either as such or else in mixtures of two or more. A melting point of the plastics barrier layer in the range from more than 155 to 300° C., preferably in the range from 160 to 280° C. and particularly preferably in the range from 170 to 270° C. can prove advantageous according to the invention. A preferred electrically insulating barrier layer is a plastics barrier layer.

It is further preferable that the weight per unit area of the plastics barrier layer is in the range from 2 to 120 g/m$^2$, preferably in the range from 3 to 60 g/m$^2$, particularly preferably in the range from 4 to 40 g/m$^2$ and with further preference from 6 to 30 g/m$^2$. It is further preferable that the plastics barrier layer can be obtained from melts, for example via extrusion, in particular layer extrusion. It is further preferable that the plastics barrier layer can be introduced into the sheetlike composite by way of lamination. Preference is given here to incorporation of a foil into the sheetlike composite. According to another embodiment it is also possible to select plastics barrier layers which can be obtained via deposition from a solution or dispersion of plastics.

Suitable polymers are preferably those whose weight-average molar mass, determined by gel permeation chromatography (GPC) using light scattering, is in the range from $3 \cdot 10^3$ to $1 \cdot 10^7$ g/mol, preferably in the range from $5 \cdot 10^3$ to $1 \cdot 10^6$ g/mol and particularly preferably in the range from $6 \cdot 10^3$ to $1 \cdot 10^5$ g/mol. Suitable polymers that in particular can be used are polyamide (PA) or polyethylene vinyl alcohol (EVOH) or a mixture thereof.

Among the polyamides, it is possible to use any of the PAs that appear to a person skilled in the art to be suitable for the inventive use. Particular mention should be made here of PA 6, PA 6.6, PA 6.10, PA 6.12, PA 11 or PA 12 or a mixture of at least two thereof, particular preference being given here to PA 6 and PA 6.6, and further preference being given here to PA 6. PA 6 is obtainable commercially by way of example with the trademark Akulon®, Durethan® and Ultramid®. Other suitable materials are amorphous polyamides such as MXD6, Grivory®, and also Selar® PA. It is further preferable that the density of the PA is in the range from 1.01 to 1.40 g/cm$^3$, preferably in the range from 1.05 to 1.30 g/cm$^3$ and particularly preferably in the range from 1.08 to 1.25 g/cm$^3$. It is further preferable that the viscosity number of the PA is in the range from 130 to 185 ml/g and preferably in the range from 140 to 180 ml/g.

EVOH that can be used is any of the EVOHs that appear to the person skilled in the art to be suitable for the inventive use. Examples here are obtainable commercially inter alia with the trademark EVAL™ from EVAL Europe NV, Belgium in a plurality of different embodiments, examples being the grades EVAL™ F104B and EVAL™ LR171B. Preferred EVOHs have at least one, two, a plurality of, or all of, the following properties:
  ethylene content in a range from 20 to 60 mol %, preferably from 25 to 45 mol %;
  density in the range from 1.0 to 1.4 g/cm$^3$, preferably from 1.1 to 1.3 g/cm$^3$;
  melting point in the range from above 155 to 235° C., preferably from 165 to 225° C.;
  MFR (210° C./2.16 kg if $T_{M(EVOH)}$<230° C.; 230° C./2.16 kg, if 210° C.<$T_{M(EVOH)}$<230° C.) in the range from 1 to 25 g/10 min, preferably from 2 to 20 g/10 min;
  oxygen permeation rate in the range from 0.05 to 3.2 cm$^3 \cdot$20 μm/m$^2 \cdot$day·atm, preferably in the range from 0.1 to 1 cm$^3 \cdot$20 μm/m$^2 \cdot$day·atm.

According to alternative b. the barrier layer is a metal layer. A suitable metal layer is in principle any of the layers using metals which are known to the person skilled in the art and which can provide high impermeability to light and to oxygen. According to a preferred embodiment the metal layer can take the form of a film or of a deposited layer, e.g. after a physical gas-phase deposition process. It is preferable that the metal layer is an uninterrupted layer. According to another preferred embodiment, the thickness of the metal layer is in the range from 3 to 20 μm, preferably in the range from 3.5 to 12 μm and particularly preferably in the range from 4 to 10 μm.

Metals preferably selected are aluminium, iron or copper. A preferred iron layer can be a steel layer, e.g. in the form of a foil. It is further preferable that the metal layer is a layer using aluminium. The aluminium layer can advantageously consist of an aluminium alloy, for example AlFeMn, AlFe1.5Mn, AlFeSi or AlFeSiMn. Purity is usually 97.5% or higher, preferably 98.5% or higher, based in each case on the entire aluminium layer. In a particular embodiment the metal layer consists of an aluminium foil. The extensibility of suitable aluminium foils is more than 1%, preferably more than 1.3% and particularly preferably more than 1.5%, and their tensile strength is more than 30 N/mm$^2$, preferably more than 40 N/mm$^2$ and particularly preferably more than 50 N/mm$^2$. Suitable aluminium foils exhibit a droplet size of more than 3 mm in the pipette test, preferably more than 4 mm and particularly preferably more than 5 mm. Suitable alloys for the production of aluminium layers or aluminium foils are obtainable commercially as EN AW 1200, EN AW 8079 or EN AW 8111 from Hydro Aluminium Deutschland GmbH or Amcor Flexibles Singen GmbH. A preferred electrically conductive barrier layer is a metal barrier layer, particularly preferably an aluminium barrier layer.

When a metal foil is used as barrier layer, there can be an adhesion-promoter layer provided on one or both sides of the metal foil between the metal foil and the closest polymer layer. According to a particular embodiment of the container of the invention, however, there is no adhesion-promoter layer provided on any side of the metal foil between the metal foil and the closest polymer layer.

It is further preferable to select a metal oxide layer as barrier layer according to alternative c. Metal oxide layers that can be used are any of the metal oxide layers that are familiar to the person skilled in the art and that appear suitable for achieving a barrier effect in relation to light, water vapour and/or gas. In particular, preference is given to metal oxide layers based on the abovementioned metals aluminium, iron or copper and also to metal oxide layers based on compounds of titanium or silicon oxide. A metal oxide layer is produced by way of example via deposition of a metal oxide from a vapour onto a plastics layer, for example an oriented polypropylene film. A preferred process for this is physical gas-phase deposition.

According to another preferred embodiment the metal layer or the metal oxide layer can take the form of a layer composite made of one or more plastics layers with a metal layer. This type of layer can be obtained by way of example via vapour deposition of a metal onto a plastics layer, for example an oriented polypropylene film. A preferred process for this is physical gas-phase deposition.

Polymer Layers

In a preferred sheetlike composite according to the invention the layer sequence further comprises an inner polymer layer, wherein the inner polymer layer superimposes the barrier layer on a side of the barrier layer which is facing away from the carrier layer. Preferably, the inner polymer layer includes from 10 to 90 wt.-%, preferably from 25 to 90 wt.-%, more preferably from 30 to 80 wt.-%, in each case based on the total weight of the inner polymer layer, of a polymer produced by means of a metallocene catalyst. A preferred polymer produced by means of a metallocene catalyst is an mPE. Additionally or alternatively, the inner polymer layer preferably includes a polymer blend, wherein the polymer blend includes from 10 to 90 wt.-%, preferably from 25 to 90 wt.-%, more preferably from 30 to 80 wt.-%, of an mPE and at least 10 wt.-%, preferably at least 15 wt.-%, more preferably at least 20 wt.-%, of a further polymer, in each case based on the total weight of the polymer blend. In a preferred sheetlike composite according to the invention the layer sequence further comprises an intermediate polymer layer, wherein the intermediate polymer layer is arranged between the carrier layer and the barrier layer.

The following specifications are preferably valid for any of the inner polymer layer, the outer polymer layer and the intermediate polymer layer, or for combinations of at least two of those. However, the sheetlike composite may comprise further polymer layers for which the following specifications are also valid. The polymer layer can comprise further constituents. It is preferable that these polymer layers are introduced or, respectively, applied into the layer sequence in an extrusion process. The further constituents of the polymer layers are preferably constituents which do not adversely affect the behaviour of the polymer melt when applied as layer. The further constituents can by way of example be inorganic compounds, such as metal salts or further plastics, for example further thermoplastics. However, it is also conceivable that the further constituents are fillers or pigments, for example carbon black or metal oxides. Suitable thermoplastics that can be used for the further constituents are in particular those that are easily processable by virtue of good extrusion properties. Materials suitable in this context are polymers obtained via chain polymerisation, in particular polyesters or polyolefins, particular preference being given here to cyclic olefin copolymers (COC), and polycyclic olefin copolymers (POC), and in particular polyethylene and polypropylene, and very particular preference being given here to polyethylene. Among the polyethylenes, preference is given to HDPE, MDPE, LDPE, LLDPE, VLDPE and PE, and also to mixtures of at least two thereof. It is also possible to use mixtures of at least two thermoplastics. Another preferred polyolefin is an m-polyolefin. The melt flow rate (MFR) of suitable polymer layers is in the range from 1 to 25 g/10 min, preferably in the range from 2 to 20 g/10 min and particularly preferably in the range from 2.5 to 15 g/10 min, their density being in the range from 0.890 g/cm$^3$ to 0.980 g/cm$^3$, preferably in the range from 0.895 g/cm$^3$ to 0.975 g/cm$^3$, and more preferably in the range from 0.900 g/cm$^3$ to 0.970 g/cm$^3$; or in the range from 0.910 g/cm$^3$ to 0.935 g/cm$^3$, preferably in the range from 0.912 g/cm$^3$ to 0.932 g/cm$^3$, and more preferably in the range from 0.915 g/cm$^3$ to 0.930 g/cm$^3$. The polymer layers preferably have at least one melting point in the range from 80 to 155° C., with preference in the range from 90 to 145° C. and particularly preferably in the range from 95 to 135° C. A preferred polymer layer is a polyolefin layer, preferably a polyethylene layer or a polypropylene layer or both.

m-Polyolefin

An m-polyolefin is a polyolefin produced by means of a metallocene catalyst. A metallocene is an organometallic compound in which there is a central metal atom arranged between two organic ligands, for example cyclopentadienyl ligands. A preferred m-polyolefin is an m-polyethylene (mPE) or an m-polypropylene or both. A further preferred m-polyethylene is one selected from the group consisting of an mLDPE, an mLLDPE, and an mHDPE, or a combination of at least two thereof.

Inner Polymer Layer

In a preferred embodiment the inner polymer layer includes from 10 to 50% by weight, preferably 15 to 45% by weight, more preferably from 20 to 40% by weight, most preferably from 25 to 35% by weight, based in each case on the total weight of the inner polymer layer, of a polymer produced by means of a metallocene catalyst. In another preferred embodiment the inner polymer layer includes from 20 to 90% by weight, preferably from 30 to 90% by weight, more preferably from 40 to 90% by weight, more preferably from 50 to 90% by weight, more preferably from 60 to 90% by weight, most preferably from 70 to 85% by weight, based in each case on the total weight of the inner polymer layer, of a polymer produced by means of a metallocene catalyst.

It is preferable that the inner polymer layer consists of the polymer blend including an mPE and a further polymer. A preferred further polymer is one selected of a PE, am LDPE and an LLDPE or a combination of those. In a preferred embodiment the polymer blend includes from 10 to 50% by weight, preferably from 15 to 45% by weight, more preferably from 20 to 40% by weight, most preferably from 25 to 35% by weight, of an mPE and at least 50% by weight, preferably at least 55% by weight, more preferably at least 60% by weight, most preferably at least 65% by weight, of a further polymer, based in each case on the total weight of the polymer blend. In another preferred embodiment the polymer blend includes from 20 to 90% by weight, preferably from 30 to 90% by weight, more preferably from 40 to 90% by weight, more preferably from 50 to 90% by weight, more preferably from 60 to 90% by weight, most preferably from 70 to 85% by weight, of an mPE and at least 10% by weight, preferably at least 15% by weight, of a further polymer, based in each case on the total weight of the polymer blend. The proportions of mPE and of further polymer in the polymer blend here are preferably combined in such a way that the sum of the proportions is 100% by weight. In each case the preferred proportions of mPE and of further polymer in the polymer blend are combined in such a way that the sum of the proportions is not more than 100% by weight. It is preferable that the inner surface of the sheetlike composite is a surface of the inner polymer layer that faces away from the barrier layer. The innersurface of the sheetlike composite here preferably is the surface which in a container to be produced from the sheetlike composite faces predominantly inwards, i.e. in particular is in direct contact with a food contained in the container.

Outer Polymer Layer

The outer polymer layer preferably comprises a polyethylene or a polypropylene or both. Here, preferred polyethylenes are LDPE, mPE and HDPE or mixtures of those. A preferred outer polymer layer comprises at least 50% by weight, preferably at least 60% by weight, more preferably 70% by weight, more preferably 90% by weight, most preferably 90% by weight, in each case based on the weight of the outer polymer layer, of an LDPE.

Melting Points

A preferred m-polyolefin is characterised by at least one first melting point and one second melting point. It is preferable that the m-polyolefin is characterised by a third melting point in addition to the first and the second melting point. A preferred first melting point is in the range from 84 to 108° C., preferably from 89 to 103° C., more preferably from 94 to 98° C. A preferred further melting point is in the range from 100 to 124° C., preferably from 105 to 119° C., more preferably from 110 to 114° C.

Adhesion, Adhesion-Promoter Layer

There can be an adhesion-promoter layer located between layers of the sheetlike composite which do not adjoin each other. In particular, there can be an adhesion-promoter layer located between the barrier layer and the inner polymer layer or the carrier layer and the barrier layer. Plastics which can be used as adhesion promoters in an adhesion-promoter layer are any of those which, by virtue of functionalisation by means of suitable functional groups, are suitable to produce a secure bond via formation of ionic bonds or covalent bonds to a surface of a respective adjacent layer. The materials are preferably functionalised polyolefins obtained via copolymerisation of ethylene with acrylic acids such as acrylic acid or methacrylic acid, crotonic acid, acrylates, acrylate derivatives or carboxylic anhydrides containing double bonds, for example maleic anhydride, or at least two thereof. Among these, preference is given to polyethylene-maleic anhydride graft polymers (EMAH), ethylene-acrylic acid copolymers (EAA) or ethylene-methacrylic acid copolymers (EMAA), which are marketed by way of example with the trademarks Bynel® and Nucrel®0609HSA by DuPont or Escor®6000ExCo by ExxonMobil Chemicals.

According to the invention it is preferable that the adhesion between a carrier layer, a polymer layer or a barrier layer and the respective closest layer is at least 0.5 N/15 mm, preferably at least 0.7 N/15 mm and particularly preferably at least 0.8 N/15 mm. In an embodiment of the invention it is preferable that the adhesion between a polymer layer and a carrier layer is at least 0.3 N/15 mm, preferably at least 0.5 N/15 mm and particularly preferably at least 0.7 N/15 mm. It is further preferable that the adhesion between a barrier layer and a polymer layer is at least 0.8 N/15 mm, preferably at least 1.0 N/15 mm and particularly preferably at least 1.4 N/15 mm. In the event that a barrier layer follows a polymer layer indirectly by way of an adhesion-promoter layer it is preferable that the adhesion between the barrier layer and the adhesion-promoter layer is at least 1.8 N/15 mm, preferably at least 2.2 N/15 mm and particularly preferably at least 2.8 N/15 mm. In a particular embodiment the adhesion between the individual layers is so strong that the adhesion test leads to tearing of a carrier layer, the term used in the event of paperboard or cardboard as carrier layer being paperboard or cardboard fibre tear.

Container Precursor

A container precursor is a precursor of a closed container produced during the production of a closed container. The container precursor here preferably includes the sheetlike composite in cut-to-size form. A preferred container precursor has been cut to size and is designed for the production of a single closed container. Another term used for a preferred container precursor which has been cut to size and is designed for the production of a single closed container is also referred to a jacket or a sleeve. The jacket or sleeve here includes the folded sheetlike composite. The jacket or sleeve moreover includes a longitudinal seam and is open in a top region and in a base region. The term tube is often used for a typical container precursor which has been cut to size and is designed for the production of a plurality of closed containers.

A preferred container precursor includes the sheetlike composite according to the invention in a manner such that the sheetlike composite has been folded at least once, preferably at least twice, more preferably at least 3 times, most preferably at least 4 times, thereby obtaining longitudinal folds. A preferred container precursor is of a one-piece design. It is particularly preferable that a bottom region of the container precursor is of a one-piece design with a lateral region of the container precursor.

Container

The closed container of the invention can have a plurality of different shapes, but preference is given to a structure that is in essence a rectangular parallelepiped. It is moreover possible that the entire area of the container is composed of the sheetlike composite, or that the container has a two- or multipart structure. In the case of a multipart structure it is conceivable that other materials are also used alongside the sheetlike composite, an example being plastic, which in particular can be used in the top or bottom regions of the container. However, it is preferable here that at least 50%, particularly at least 70% and more preferably at least 90%, of the area of the container is composed of the sheetlike composite. The container can moreover comprise a device for the discharge of the contents. This can by way of example be formed from plastic and applied to the external side of the container. It is also conceivable that this device has been integrated into the container via "direct injection moulding". According to a preferred embodiment the container of the invention has at least one folded edge, preferably from 4 to 22, or even more folded edges, particularly preferably from 7 to 12 folded edges. For the purposes of the present invention the expression folded edge applies to regions produced when an area is folded. Examples of folded edges that may be mentioned are the longitudinal regions where two respective wall areas of the container meet. These edges are also referred to as longitudinal edges. The container walls in the container are preferably the areas of the container, surrounded by edges. It is preferable that the closed container includes no base that is not of single-piece design with the sheetlike composite or no lid that is not of single-piece design with the sheetlike composite, or both.

Foodstuff

A preferred closed container of the invention includes a foodstuff. Materials that can be regarded as foodstuff are any of the solid or liquid foodstuffs known to the person skilled in the art for human consumption, and also those for consumption by animals. Preferred foodstuffs are liquid above 5° C., examples being dairy products, soups, sauces, and non-carbonated drinks There are various methods for filling the container or the container precursor. A first possibility is that the foodstuff and the container or the container precursor are separately, before the filling process, sterilised to the greatest possible extent via suitable measures such as treatment of the container or of the container precursor with $H_2O_2$, UV radiation or other suitable high-energy radiation, plasma or a combination of at least two thereof, and also heating of the food, and that the container or the container precursor is then filled. This filling method is often termed "aseptic filling", and is preferred according to the invention. In another method that is widely used, in addition to or else instead of aseptic filling, the container or container precursor filled with foodstuff is heated to reduce the number of germs. This is preferably achieved via pasteurisation or autoclaving. In this procedure it is also possible to use less sterile foodstuffs and containers or container precursors.

Hole, Opening Aid

In order to provide easier opening of the closed container of the invention, the carrier layer can comprise at least one hole. In a particular embodiment the hole has been covered at least by the barrier layer, and preferably a polymer layer, particularly preferably one of the outer polymer layer, the inner polymer layer, and the intermediate polymer layer or combinations of at least two of those, as hole-covering layers. There can moreover be one or more further layers, in particular adhesion-promoter layers, provided between the abovementioned layers. It is preferable here that the hole-covering layers have been joined to one another at least to some extent, preferably at least 30%, with preference at least 70% and with particular preference at least 90% of the area formed by the hole. According to a particular embodiment it is preferable that the hole penetrates through the entire sheetlike composite and is covered by a closure or opening device that seals the hole. In connection with a preferred embodiment the hole provided in the carrier layer can have any shape that is known to the person skilled in the art and is suitable for various closures, drinking straws or opening aids. Opening of a closed container is mostly achieved by destroying, at least to some extent, the hole-covering layers covering the hole. This destruction can be achieved via cutting, pressing into the container or pulling out of the container. The destruction can be achieved via an openable closure joined to the container and arranged in the region of the hole, mostly above the hole, or via a drinking straw which is forced through the hole-covering layers covering the hole.

Skiving

According to the invention it is preferred for the carrier layer to be skived in the first wall region in the second ply. Further, it is preferred for the carrier layer to be skived in the second wall region in the first ply and in the second ply. Skiving is a process step known to the person skilled in the art to reduce the layer thickness of a layer, preferably a carrier layer, more preferably a carrier layer selected from the group consisting of cardboard, paperboard, and paper, or a combination of at least two thereof. Skiving is preferably carried out using a machining tool, or a cutting tool, or both. A preferred machining tool is a rotating tool. A preferred rotating tool is a knife, preferably a pot knife, or a milling tool, or both. A further preferred machining tool is a knife, preferably a rotating knife, most preferably a pot knife, or a milling tool, or both.

Folding the Sheet-Like Composite

The sheet-like composite is preferably folded at a a temperature in the range from 10 to 50° C., preferably in a range from 15 to 45° C., and more preferably in a range from 20 to 40° C. This can be achieved if the sheet-like composite has a temperature in the aforementioned ranges. Further, a folding tool, preferably together with sheet-like composite, preferably has a temperature in the aforementioned ranges. For this, the folding tool does not have a heater. Rather, the folding tool, or the sheet-like composite, or both, can be cooled. Further, it is preferred that folding is carried out at a temperature of no more than 50° C. as cold-folding and that sealing is carried out at a temperature of over 50° C., preferably over 80° C. and more preferably over 120° C. as heat-sealing. The foregoing conditions, in particular the temperatures, also preferably apply in the vicinity of the folding, for example, in the housing of the folding tool.

Further, the cold-folding, or the cold-folding in combination with the heat-sealing, is preferably applied at fold-forming angles $\mu$ less than 100°, preferably less than 90°, more preferably less than 70° and most preferably less than 50°. The angle $\mu$ is formed between two adjoining fold surfaces.

Herein, folding is understood to mean a process in which an elongated, angle-forming crease is generated in the folded sheet-like composite preferably by means of a folding edge of a folding tool. For this, frequently two adjoining areas of a sheet-like composite must be increasingly bent towards one another. The folding gives rise to at least two adjoining fold surfaces, which can then be bonded together, at least partially, to form a container area. According to the invention, the bonding can be made using any measure that appears suitable to the person skilled in the art which enables as gas-tight and water-tight a connection as possible to be formed.

Further, the fold surfaces preferably form an angle g of less than 90°, preferably less than 45° and more preferably less than 20°. Frequently, the fold surfaces are folded to the extent that they come to lie on top of each other at the end of the fold. This is particularly advantageous, if the overlaying folds are then bonded together to form the base of the container or the head of the container, which is often structured in the form of a gable or flat. Regarding the gable arrangement, reference is made to WO 90/09926 A2 by way of example.

Closing Tool

A preferred closing tool is formed to create a seal. A further preferred closing tool comprises at least an outlet opening for a hot gas. A further preferred closing tool comprises a sonotrode, or an anvil, or both.

Radiation

In the case of heating by exposure to radiation, any type of radiation deemed suitable by the person skilled in the art for softening the plastics of the polymer layers is taken into consideration. Preferred types of radiation are IR rays, UV rays, and microwaves. In the case of IR waves, which are also used for the IR welding of sheet-like composites, wavelengths are in a range from 0.7 to 5 µm. Further, laser beams in a wavelength range from 0.6 to less than 1.6 µm can be used. In connection with the use of IR rays, these are generated by various suitable emitters known to the person skilled in the art. Short-wave emitters in a range from 1 to 1.6 µm are preferably halogen emitters. Medium-wave emitters in a range from >1.6 to 3.5 µm are, for example, metal-foil emitters. Quartz emitters are frequently used as long-wave emitters in a range >3.5 µm. Lasers are used increasingly often. Diode lasers in a wavelength range from 0.8 to 1 µm, Nd:YAG lasers at approximately 1 µm, and $CO_2$-Laser lasers at approximately 10.6 µm, are used. High-frequency technologies with a frequency range from 10 to 45 MHz are frequently used in an output range from 0.1 to 100 kW.

Ultrasound Vibration

In the case of heating by ultrasound vibration, the following treatment parameters are preferred:

P1 a frequency in a range from 5 to 100 kHz, preferably in a range from 10 to 50 kHz and more preferably in a range from 15 to 40 kHz;

P2 an amplitude in a range from 2 to 100 µm, preferably in a range from 5 to 70 µm kHz and more preferably in a range from 10 to 50 µm;

P3 period of vibration (i.e. the period of time in which a vibrating body such as a sonotrode or inductor acts on the sheet-like composite like a contact rocker) in a range from 50 to 1000 msec, preferably in a range from 100 to 600 msec, and more preferably in a range from 150 to 300 msec.

For the appropriate selection of radiation or vibration conditions, it is advantageous to consider the internal resonances of the plastics and to select frequencies that are close to them.

Contact with a Hot Solid

Heating via contact with a hot solid may take place, for example, through a hotplate or hot mould that is in direct contact with the sheet-like composite, which transmits heat to the sheet-like composite.

Hot Gas

Heating via contact to a hot gas may be effected by directing the hot gas, preferably hot air, at the sheet-like composite by means of suitable fans, outlet openings or nozzles, or a combination thereof. Frequently, a contact heater and hot gas are used simultaneously. For example, a holding device for a tube formed from the sheet-like composite, through which hot gas has flowed and which has therefore been heated, and which transmits the hot gas through suitable openings, may heat the sheet-like composite through contact with the wall of the holding device and the hot gas.

Test Methods

The following test methods were used for the purposes of the invention. Unless otherwise stated the measurements were made at ambient temperature 25° C., ambient air pressure 100 kPa (0.986 atm) and relative humidity 50%.

MFR Value

The MFR value is measured in accordance with the standard ISO 1133-1:2012-03 (unless otherwise stated at 190° C. with 2.16 kg).

Density

Density is measured in accordance with the standard ISO 1183-1:2012-05.

Melting Point

Melting point is determined according to the DSC method of ISO 11357-1 and -5. The equipment is calibrated in accordance with the manufacturer's instructions with reference to the following measurements:

indium temperature—onset temperature,
enthalpy of fusion of indium,
zinc temperature—onset temperature.

Viscosity Number of PA

The viscosity number of PA is measured in accordance with the standard ISO 307 in 95% sulphuric acid.

Oxygen Permeation Rate

Oxygen permeation rate is determined in accordance with the standard ISO 14663-2 Annex C at 20° C. and 65% relative humidity.

Paperboard Moisture Content

Paperboard moisture content is measured in accordance with the standard ISO 287:2009.

Adhesion of Layers

Adhesion between two adjacent layers is determined by fixing these onto 90° peel test equipment, for example a "German rotating wheel fixture" from Instron, on a rotating roll which rotates at 40 mm/min during the measurement. The samples were cut to size in advance, into strips of width 15 mm. At one side of the sample the sublayers are separated from one another, and the separated end is clamped into a vertically upwards oriented tensile apparatus. The tensile apparatus has attached measurement equipment for determining the tensile force. During the rotation of the roll, the force required to separate the sublayers from one another is measured. This force corresponds to the adhesion between the layers, and is stated in N/15 mm. The separation of the individual layers can be achieved by way of example mechanically, or via a specific pretreatment, for example via softening of the sample for 3 min in 30% acetic acid at 60° C.

Molecular Weight Distribution

Molecular weight distribution is measured by gel permeation chromatography, using light scattering: ISO 16014-3/-5.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Layer Thickness

A sample, measuring approximately 2.5 to 3.0 cm'1.0 to 1.5 cm, is taken from the composite material to be examined. The long side of the sample is placed transversely to the direction of the extrusion. The sample is fixed in a metal clamp, which forms a smooth surface. The sample should not protrude more than 2 to 3 mm. The metal clamp is fixed prior to cutting. In order to obtain a clean cut, especially of the cardboard fibres if present, the part of the sample protruding from the metal clamp is frozen with cold spray. This part is then removed using a disposable blade (Leica, Microtome Blades). The hold of the sample in the metal clamp is now eased to such an extent that the sample can be pushed approximately 3 to 4 mm out of the metal clamp. It is then fixed again. For examination under the light microscope (Nicon Eclipse E800), the sample is placed in the sample holder on the object plate of the light microscope under one of the lenses (magnification ×2.5; ×5; ×10; ×20; ×50). The appropriate lens is chosen on the basis of the layer thickness of the layer of the area to be examined. Precise centring is carried out during microscopy. In most cases side lighting (swan-neck lights) is used as the source light. If necessary, the incident-light illuminator of the light microscope is used in addition or alternatively. If the sample is optimally sharpened and illuminated, the individual layers of the composite should be recognisable. An Olympus camera (Olympus DP 71) with suitable image processing software (analySIS) by Analysis is used for documentation and measurements. It is also used to determine the layer thickness of the individual layers.

Compression Test

For this test, 5 containers are manufactured and filled with water before closing the container. The purpose of the test is to determine the compressive strength along the longitudinal axis of the container. It may also be used to assess the resilience of filled containers in the static case of storage and in the dynamic case of transportation. The compression test is carried out on the individual containers in accordance with DIN EN ISO 12048. The preceding storage of the containers is carried out in accordance with DIN EN ISO 2233:2000. The measuring device used is TIRAtest 28025 (Tira GmbH; Eisfelder Strasse 23/25; 96528 Schalkau, Germany). The mean value of the maximum breaking load (load value) is determined. This describes the value that leads to the failure of the containers.

Bending Resistance

The bending resistance is determined according to the bending test method described in the standard ISO 2493-2:2011. For the measurement an L&W Bending Tester code 160 of Lorentzen & Wettre, Sweden is applied. As described in the standard, samples used to determine the bending resistances have a width of 38 mm and a clamping length of 50 mm. Therein, only samples having no crease line, fold or edge are used in the bending test. The samples are selected in accordance with ISO 186. The bending resistance is determined by deflecting the sample by 15°. The bending test specified by the standard ISO 2493-2:2011 is a two-point bending test. As referred to herein, a direction in which the sheetlike composite or the carrier layer has a bending resistance is a direction of a straight line connecting the two attack points of the two-point bending test. Preferably, this direction is a direction in which the sheetlike composite or the carrier layer respectively curves upon bending. Perpendicular to the direction of the bending resistance the sheetlike composite or carrier layer preferably forms a straight fold line if the sample is deflected by an angle large enough to fold it.

Quality of the Longitudinal Seam

To determine the quality of the sealing of the longitudinal seam of a container, the inner surface of the outer lamina of the sheetlike composite is separated manually from the outer surface of the inner lamina of the sheetlike composite along the longitudinal seam to be tested. The resultant surfaces of the separated laminas are assessed visually. 3 test runs are conducted in each case. The results are assessed by the naked eye. Therein, the more cardboard or paper fibres are visible on the resultant surfaces of the separated laminas the better the quality of the seam as these fibres indicate that the sealing of the longitudinal seam was stronger than the internal strength of the carrier layer.

The invention is described in more detail below via Examples and drawings, wherein the Examples and drawings do not imply any restriction of the invention. The drawings are moreover diagrammatic and not true to scale.

For the examples according to the invention and the comparative examples not according to the invention, laminates with the following layer sequence were produced by means of an extrusion coating system which is standard in laminar extrusion processes.

TABLE 1 layer sequence used in the examples and comparative examples according to the invention

| layer | material | grammage [g/m$^2$] |
|---|---|---|
| outer polymer layer | LDPE Novex ® 19N430 of Ineos GmbH, Cologne, Germany | 22 |
| colour application | TS 600 of Siegwerk Druckfarben AG & Co. KGaA, Germany | — |
| carrier layer | Liquid Packaging Board Stora Enso Natura T Duplex, double coating layer, Scott-Bond 200 J/m$^2$, residual moisture 7.5% | 210 |
| intermediate polymer layer | LDPE Novex ® 19N430 of Ineos GmbH, Cologne, Germany | 22 |
| barrier layer | aluminium foil EN AW 8079 of Hydro Aluminium Deutschland GmbH | here: thickness 6 μm |
| adhesion promoter layer | co-extrudate (1) Escor 6000 HSC of Exxon Mobil Corporation and (2) LDPE Novex ® 19N430 of Ineos GmbH, Cologne, Germany | (1) - 4 (2) - 22 |
| inner polymer layer | blend of (1) 30 wt.-% of an mLDPE and (2) 70 wt.-% of an LDPE | 22 |

Laminate Production

Laminates consisting of the layers given in table 1 above are produced applying an extrusion coating system of the firm Davis Standard. Therein, the extrusion temperature is in the range from about 280 to 310° C. Temperature variations of ±6° C. are understood to be within normal tolerances. Grammage variations of ±3 g/m$^2$ are within normal tolerances as well. In a first step, one hole for each container to be produced from the laminate is applied to the carrier layer by die cutting. Subsequently, the colour application is printed onto the carrier layer by flexographic printing. Therein, 4 inks of different colours of the series TS 600 of the firm Siegwerk Druckfarben AG & Co. KGaA, Germany are applied in 4 subsequent printing steps, wherein after each printing step the applied ink is dried. Thus, a four-colour print decoration is obtained. The printed carrier layer is creased, thereby obtaining crease lines in the carrier layer. In particular, longitudinal crease lines, as depicted in FIG. 2 below, are introduced. Therein, the longitudinal crease lines are oriented perpendicular to the running direction or fibre run of the paper board material of the carrier layer. Hence, in the cuboid container to be produced the running direction or fibre run will be oriented perpendicular to the four longitudinal edges of the container. Subsequently, the outer polymer layer is applied to the decoration, thereby covering the holes. In a following step, the barrier layer is applied to the carrier layer together with the intermediate polymer layer. Subsequently, the adhesion promoter layer and the inner polymer layer are co-extruded onto the barrier layer. In order to allow for applying of the several polymer layers, the polymers are molten in an extruder. For applying a polymer of a layer, the obtained polymer melt is fed via a feed block into a nozzle and from there extruded to the substrate.

Container Production

Further, the laminate obtained as described above is cut into sections, wherein each section is suitable for producing a single container from it. Therein, each of the sections comprises one of the holes mentioned above. From each section a container precursor in form of a sleeve as shown in FIG. 2 is obtained by folding along the 4 longitudinal crease lines and sealing of overlapping fold areas (longitudinal rims) onto each other, thereby obtaining a longitudinal seam. From this container precursor, a closed container as shown in FIG. 6 ("brick-type") is formed using a filling machine CFA 712 of SIG Combibloc, Linnich, Germany. Therein, a bottom region is formed by folding and closed by heat sealing. Thus, a cup with an open top region is obtained. The cup is sterilised using hydrogen peroxide. Further, the cup is filled with water. By further folding and ultrasound sealing the top region of the cup, having the hole, is closed. Thus, a closed and filled container is obtained. Further, an opening aid is attached to the container, covering the hole.

The geometries of the longitudinal seams summarised in table 2 below were generated in the examples and the comparative examples. In table 2 the smaller thickness of a carrier layer means that this carrier layer was skived in this ply. Skived carrier layers have a thickness of 230 μm. The larger thickness of the carrier layer means that the carrier layer, with the larger thickness, is unskived in this ply of the laminate. If the carrier layer is of equal thickness in all plies, this means that the carrier layer is unskived in this wall region. An unskived carrier layer has a thickness of 430 μm. The skiving was effected by means of a pot knife. Bonding of plies onto each other was effected as heat-sealing of polymers.

TABLE 2

Longitudinal seam geometries according to the examples and comparative examples

| | Thicknesses of the carrier layer in the plies in the first wall region | Thicknesses of the carrier layers in the plies in the second wall region | Existence of a third wall region in the longitudinal seam |
|---|---|---|---|
| Comparative example 1 | first ply = third ply | first ply = third ply | no |
| Comparative example 2 | second ply < first ply = third ply | second ply = first ply = third ply | no |
| Example 1 | second ply < first ply = third ply | second ply < first ply = third ply | no |
| Example 2 | second ply = first ply < third ply | second v = first ply < third ply | no |
| Example 3 | second ply < first ply = third ply | second ply = first ply < third ply | no |
| Example 4 | second ply < first ply = third ply | second ply = first ply < third ply | yes |

In comparative example 1 the carrier layer is not skived in the longitudinal. The carrier layer has a continuous thickness of 430 µm. Accordingly, for the longitudinal seam, no seam was generated through the folding of the laminate and the laminate folding over on itself. There is, therefore, no second ply which is generated by the folding. As there is no skiving, the first wall region and the second wall region are identical. In a longitudinal seam according to comparative example 1, there is no third wall region, in which the first ply is bonded directly to the third ply. In FIG. 7, this seam geometry is demonstrated in a container precursor.

In comparative example 2 the carrier layer in the second ply was only skived in a peripheral area. The fold of the second ply over onto the first ply was generated in the unskived area of the carrier layer. Therefore, the carrier layer in the second ply in the first wall region is skived and hence thinner than in the first ply, but in the second wall region, it is not skived and hence as thick as in the first ply. In a longitudinal seam according to comparative example 2, there is no third wall region, in which the first ply is bonded directly to the third ply. The seam geometry of comparative example 2 is illustrated in FIG. 10 in a container precursor.

In example 1 according to the invention, the carrier layer was skived, and the skived area was completely folded over onto the first ply to create a seam, thereby obtaining the second ply. Therefore, in the second ply the carrier layer both in the first wall region and in the second wall region is thinner than the carrier layer in the first ply. Therefore, the first wall region and the second wall region are identical. In a longitudinal seam according to example 1, there is no third wall region, in which the first ply is bonded directly to the third ply. The seam geometry of example 1 is demonstrated in FIG. 8 in a container precursor.

In example 2 according to the invention, the carrier material was skived in a peripheral area of the laminate and the skived area was folded over on itself. In this way, a carrier layer being skived in the first ply was obtained, which was directly superimposed by a skived second ply in a first wall region and in a second wall region. In a longitudinal seam according to example 2, there is no third wall region, in which the first ply is bonded directly to the third ply. The seam geometry of example 2 is demonstrated in FIG. 9 in a container precursor.

Example 3 according to the invention was generated in the same way as example 2, but the skived second ply was folded over across the skived area of the first ply to touch the unskived area of the first ply. This results in a first wall region, in which a skived second ply and an unskived third ply superimpose an unskived first ply. In the second wall region, according to example 3, a skived second ply and an unskived third ply superimpose a skived first ply. In a longitudinal seam according to example 3, there is no third wall region, in which the first ply is bonded directly to the third ply. The seam geometry of example 3 is demonstrated in FIG. 3 in a container precursor.

Example 4 according to the invention is like example 3, but here the third ply extends beyond the second wall ply to touch the first ply. Therefore, there is a third wall region, in which the first ply is bonded directly to the third ply, in the longitudinal seam according to example 4. The seam geometry of example 4 is demonstrated in FIG. 4 in a container precursor.

The containers according to the above examples and the comparative examples were examined as regards their stability according to the abovementioned compression test. Further, the substandard container precursors produced as well as the average process speed during the manufacturing process were assessed.

TABLE 3

Container failure based on maximum breaking load (according to DIN EN ISO 12048), percentage of substandard container precursors as well as average process speed

| | Maximum breaking load [N] | Percentage of substandard container precursors [%] | Average process speed [m/min] |
|---|---|---|---|
| Comparative example 1 | 135 | 38 | 250 |
| Comparative example 2 | 147 | 14 | 270 |
| Example 1 | 175 | 9 | 410 |
| Example 2 | 193 | 0 | 500 |
| Example 3 | 220 | 0 | 550 |
| Example 4 | 231 | 0 | 580 |

As shown in table 3, the containers manufactured in accordance with the examples are more stable than the containers of the comparative examples. The containers of examples 2 to 4 turned out to be particularly advantageous. In addition, more substandard container precursors are produced in the manufacturing process of the containers of the comparative examples. In the manufacture of the containers according to examples 3 and 4, the percentage of substandard container precursors is 0%. Further, it is clear from Table 3 that containers manufactured in accordance with the examples can be produced more quickly. The average process speed is highest for examples 3 and 4. Overall, the results for example 4 are the most advantageous.

For further examples A to J, further containers have been produced according to the above example 3 (seam geometry shown in FIG. 3). Therein, the four-colour print decoration, which has been printed as described above, comprises the proportions of colourants given in table 4 below. The longitudinal seams of the containers of the examples A to J have been tested for their quality according to the above described test method. In this context, in table 4++++ means a better quality of the longitudinal seam than +++, +++ a better quality than ++, ++ a better quality than +, and + a better quality than 0.

TABLE 4

Dependence of the quality of the longitudinal seam of containers on the proportion of colourants in the colour application of the laminates

|  | Proportion of colourants in colour application [wt.-%] | Quality of the longitudinal seam |
|---|---|---|
| Example A | 0.5 | 0 |
| Example B | 1 | + |
| Example C | 3 | ++ |
| Example D | 5 | +++ |
| Example E | 7 | ++++ |
| Example F | 50 | ++++ |
| Example G | 52 | +++ |
| Example H | 55 | ++ |
| Example I | 60 | + |
| Example J | 65 | 0 |

For further examples a to j, further containers have been produced according to the above example 4 (seam geometry shown in FIG. 4). Therein, the four-colour print decoration, which has been printed as described above, comprises the proportions of colourants given in table 5 below. The longitudinal seams of the containers of the examples a to j have been tested for their quality according to the above described test method. In this context, in table 5+++++ means a better quality of the longitudinal seam than ++++, ++++ a better quality than +++, +++ a better quality than ++, and ++ a better quality than +.

TABLE 5

Dependence of the quality of the longitudinal seam of containers on the proportion of colourants in the colour application of the laminates

|  | Proportion of colourants in colour application [wt.-%] | Quality of the longitudinal seam |
|---|---|---|
| Example a | 0.5 | + |
| Example b | 1 | ++ |
| Example c | 3 | +++ |
| Example d | 5 | ++++ |
| Example e | 7 | +++++ |
| Example f | 50 | +++++ |
| Example g | 52 | ++++ |
| Example h | 55 | +++ |
| Example i | 60 | ++ |
| Example j | 65 | + |

Figure 6:
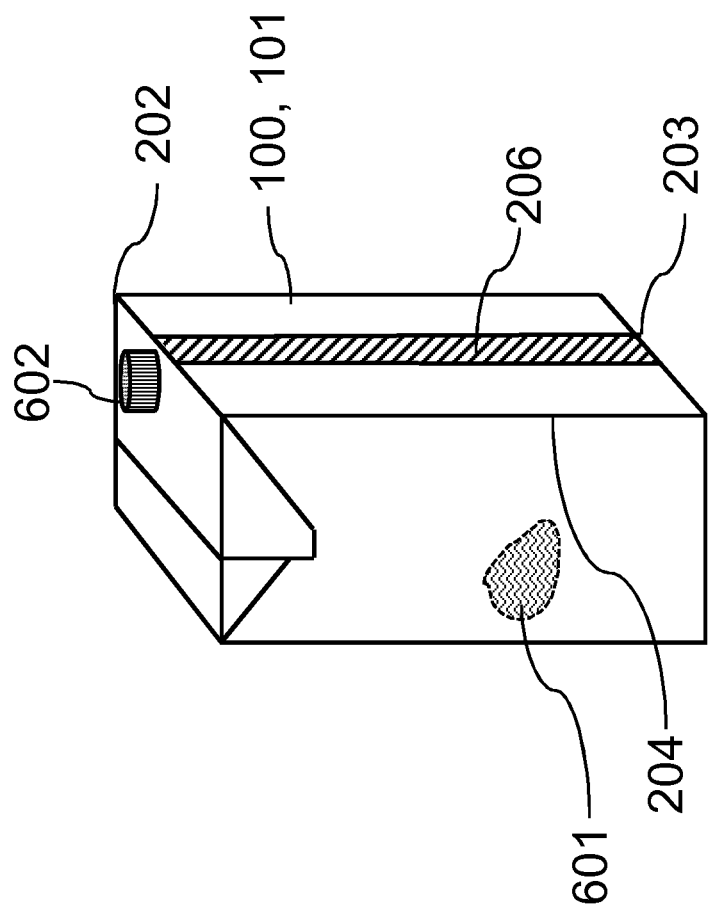
Figure 7:
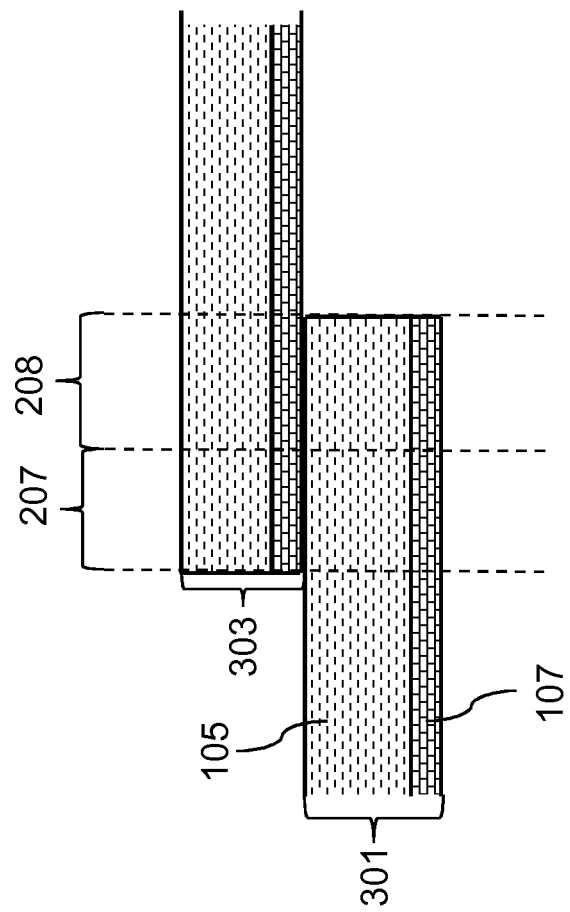
Figure 8:
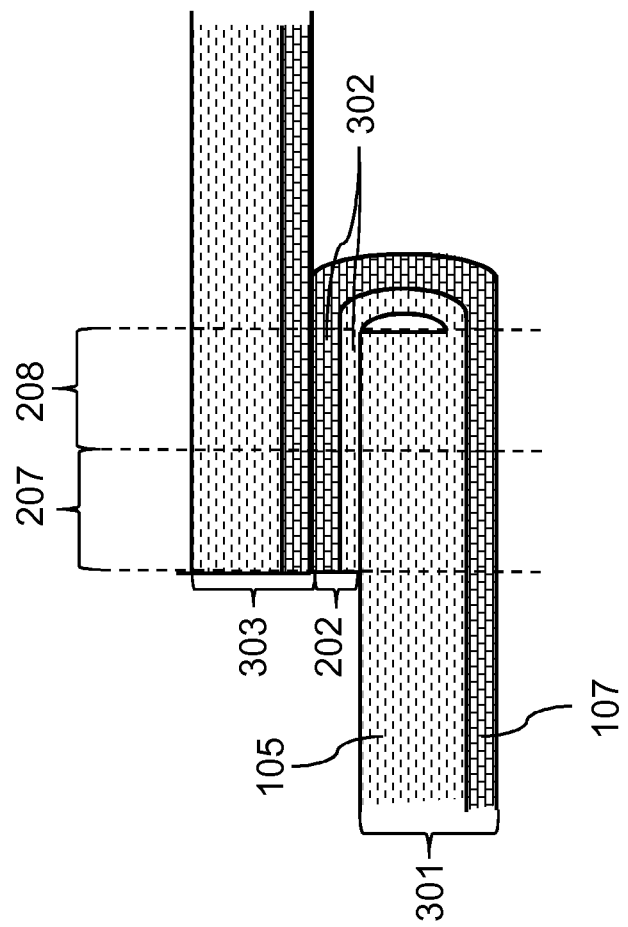
Figure 9:
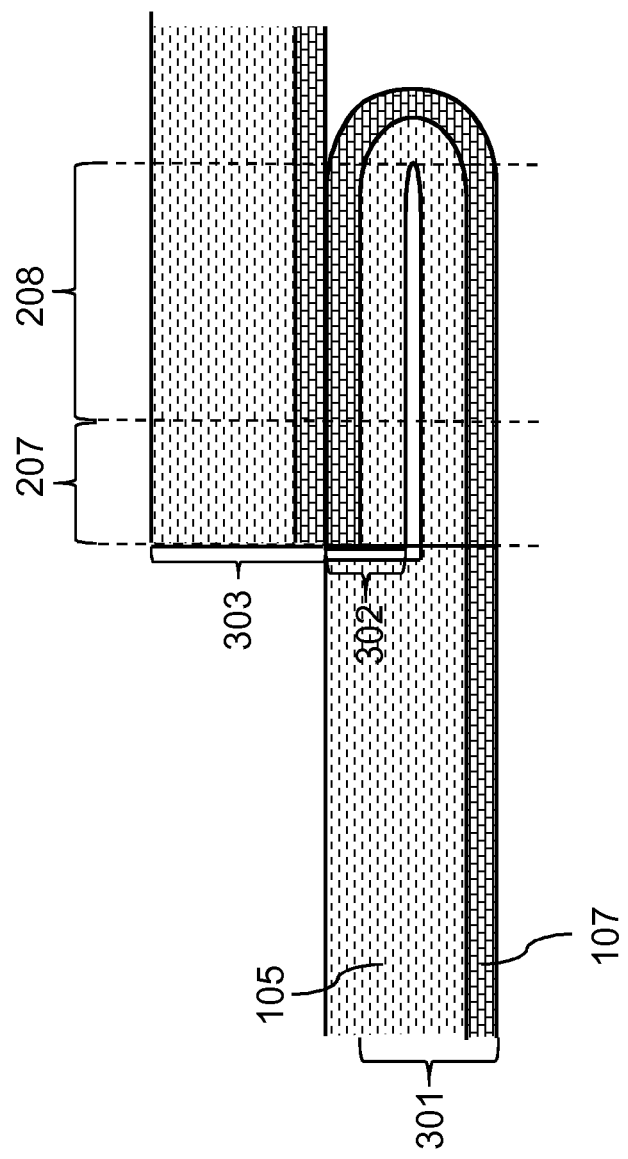
Figure 10:
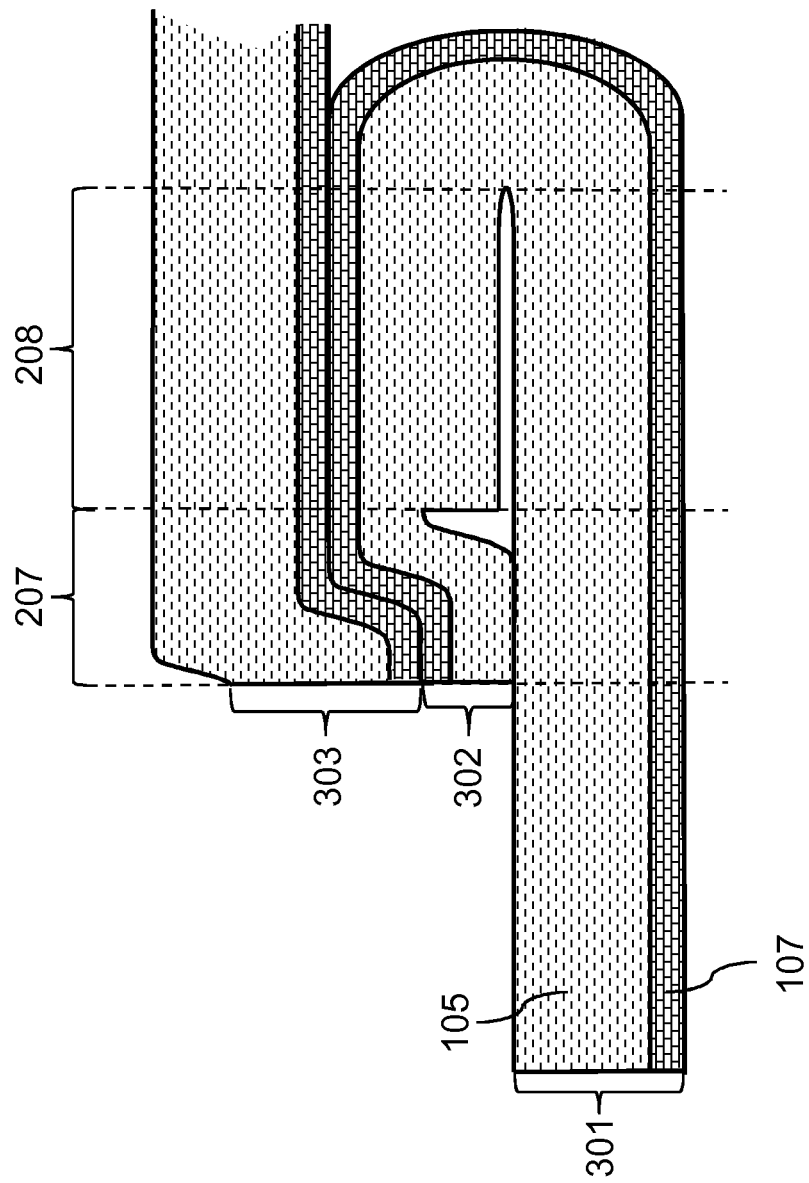

FIGS. 5a) to f) are an illustration of producing a longitudinal seam of a container precursor of the invention;

FIG. 6 is a diagrammatic view of a closed container of the invention;

FIG. 7 is a diagrammatic cross section through a longitudinal seam of a container precursor not according to the invention;

FIG. 8 is a diagrammatic cross section through a longitudinal seam of another container precursor of the invention;

FIG. 9 is a diagrammatic cross section through a longitudinal seam of another container precursor of the invention; and FIG. 10 is a diagrammatic cross section through a longitudinal seam of another container precursor not according to the invention.

Figure 1:
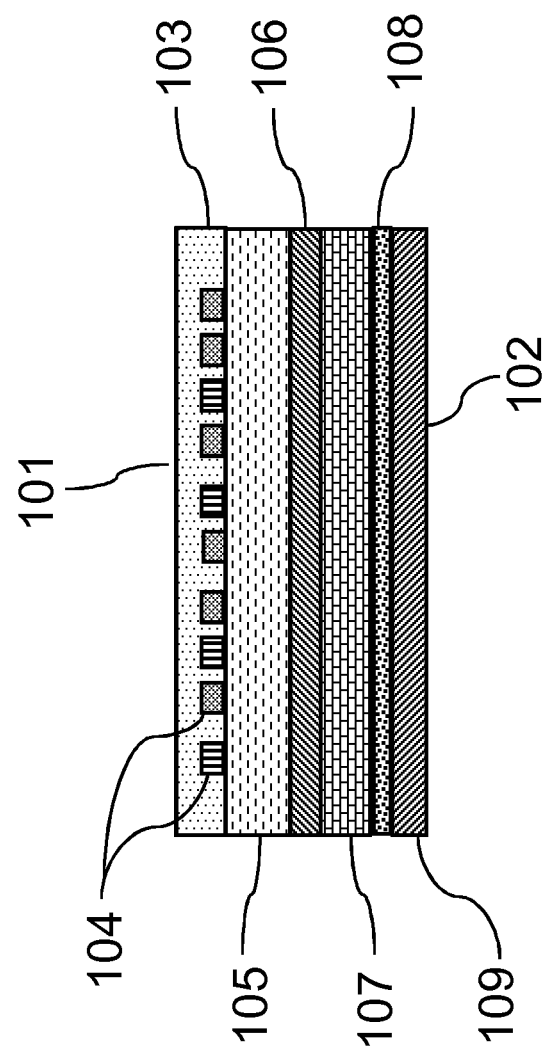
FIG. 1 is a diagrammatic cross section through a sheetlike composite.

FIG. 1 shows a diagrammatic cross section through a sheetlike composite 100 used in the invention. The sheetlike composite 100 comprises as a layer sequence in a direction from an outer surface 101 of the sheetlike composite 100 to an inner surface 102 of the sheetlike composite 100: an outer polymer layer 103, a colour application 104, a carrier layer 105, an intermediate polymer layer 106, a barrier layer 107, an adhesion promoter layer 108 and an inner polymer layer 109. Therein, the colour application comprises 2 prints of different colours. The layers of the sheetlike composite 100 of FIG. 1 are the layers given in table 1 in the context of the examples according to the invention above.

Figure 2:
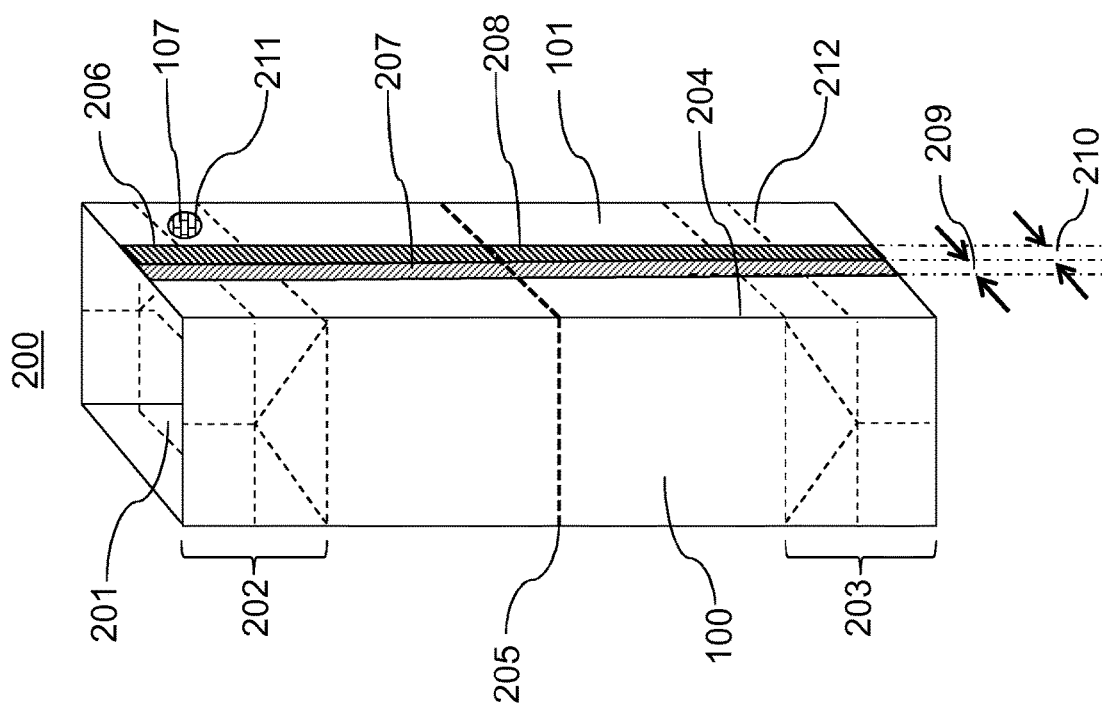
FIG. 2 is a diagrammatic view of a container precursor of the invention.

FIG. 2 shows a diagrammatic view of a container precursor 200 of the invention. The container precursor 200 shown here is a sleeve suitable for the production of a single closed container 600, in particular the closed container 600 shown in FIG. 6. The container precursor 200 surrounds an interior 201. The container precursor 200 comprises a wall, which in one piece consists of a precut of the sheet-like composite 100 of FIG. 1. Further, the sleeve includes a top region 202 and a bottom region 203. The top region 202 and the bottom region 203 respectively include crease lines 212. The top region 202 and the bottom region 203 can respectively be closed by folding along the crease lines 212 and sealing. The closed container 600 as shown in FIG. 6 can thus be obtained from the sleeve. Accordingly, the container precursor 200 is a precursor produced in the process for producing the closed container 600. In the container precursor 200 the sheetlike composite 100 has been folded along longitudinal crease lines, thereby obtaining four longitudinal folds 204 or longitudinal edges 204. The sleeve moreover includes a longitudinal seam 206 along which longitudinal rims of the sheetlike composite 100 have been sealed to one another. The longitudinal seam 206 comprises a first wall region 207 and a second wall region 208. A circumference 205 of the container precursor 200 is indicated by a thick dashed line. The first wall region 207 has a first width 209 of 3 mm along the circumference 205. The second wall region 208 has a second width 210 of 2 mm along the circumference 205. The container precursor 300 further comprises a hole 211 in the carrier layer 105. This hole 211 is covered by the outer polymer layer 103 (not shown here), the intermediate polymer layer 106 (not shown here), the barrier layer 107, the adhesion promoter layer 108 (not shown here) and the inner polymer layer 109 (not shown here) as hole-covering layers. As can be seen in FIG. 2, the outer surface 101 is facing outward, hence to the environment of the container precursor 200 or in other words away from the interior 201.

Figure 3:
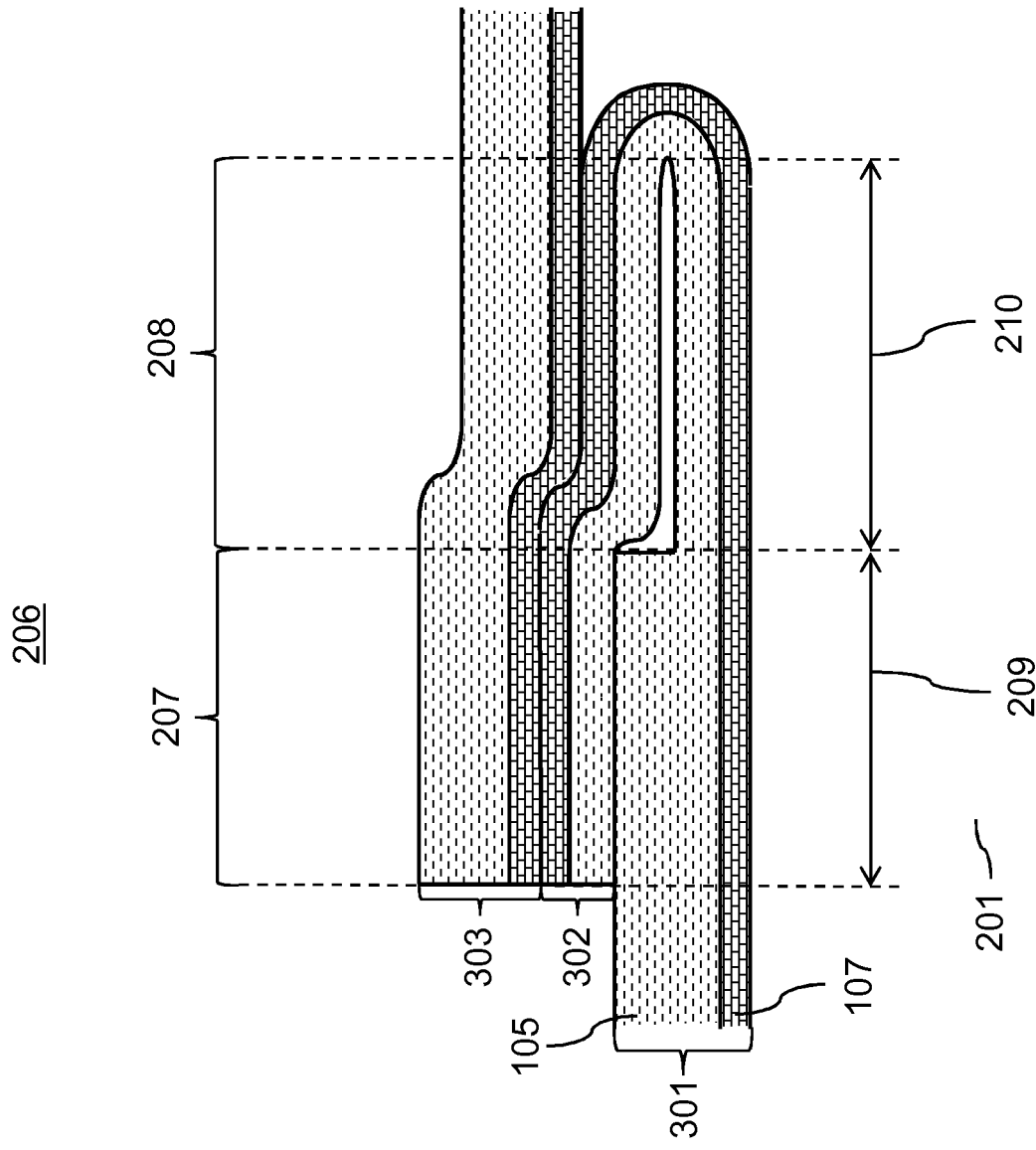
FIG. 3 is a diagrammatic cross section through a longitudinal seam of a container precursor of the invention.

FIG. 3 shows a diagrammatic cross section through a longitudinal seam 206 of a container precursor 200 of the invention. The container precursor 200 is shown in FIG. 2. Here, only the barrier layer 107 and the carrier layer 105 are shown as layers of the sheetlike composite 100. However, in unskived areas the further layers of the sheetlike composite 100 shown in FIG. 1 are understood to be present as well. The longitudinal seam 206 comprises the first wall region 207 and the second wall region 208. The first wall region 206 and the second wall region 208 abut against each other. The sheetlike composite 100 of the container precursor 200 forms a wall. This wall at least partly surrounds the interior 201 of the container precursor 200. In FIG. 3 the interior 201 of the container precursor 200 is depicted below the longitudinal seam 206 and hence in the container precursor 200. Further, the wall comprises the first wall region 207 and the second wall region 208. The first wall region 207 partly comprises as a layer sequence from the interior 201 outwards a first ply 301, a second ply 302, and a third ply 303, in each case of the sheetlike composite 100. In the first wall region 207 the first ply 301 is bonded to the second ply 302 and the second ply 302 is bonded to the third ply 303. Therein, the first ply 301 is heat sealed to the second ply 302 by means of heat-sealing with the outer polymer layer 103 of the first ply 301. The second ply 302 is skived and hence, does not comprise an outer polymer layer 103. Further, the second ply 302 is heat sealed to the third ply 303 by means of heat-sealing with the inner polymer layer 109 in the second ply 302 and the third ply 303. The second wall region 208 partly comprises as a layer sequence from the interior 201 outwards the first ply 301, the second ply 302, and the third ply 303, in each case of the sheetlike composite 100. In the second wall region 208 the second ply 302 is bonded to the third ply 303 by means of heat-sealing with the inner polymer layer 109 in the second ply 302 and the third ply 303. In the second wall region 208, the first ply 301 is not bonded to the second ply 302. In the first wall region 207: in the second ply 302 a layer thickness of the carrier layer 105 is less than in the first ply 301 and in the third ply 303. In the second wall region 208: in the third ply 303 a layer thickness of the carrier layer 105 is more than in the first ply 301 and in the second ply 302. The first wall region 207 has a first width 209 along the circumference 205 of the container precursor 200 of 3 mm. The second wall region 208 has a second width 210 along the circumference 205 of the container precursor 200 of 2 mm. The structure of the longitudinal seam 206 of FIG. 3 corresponds to example 3 above.

Figure 4:
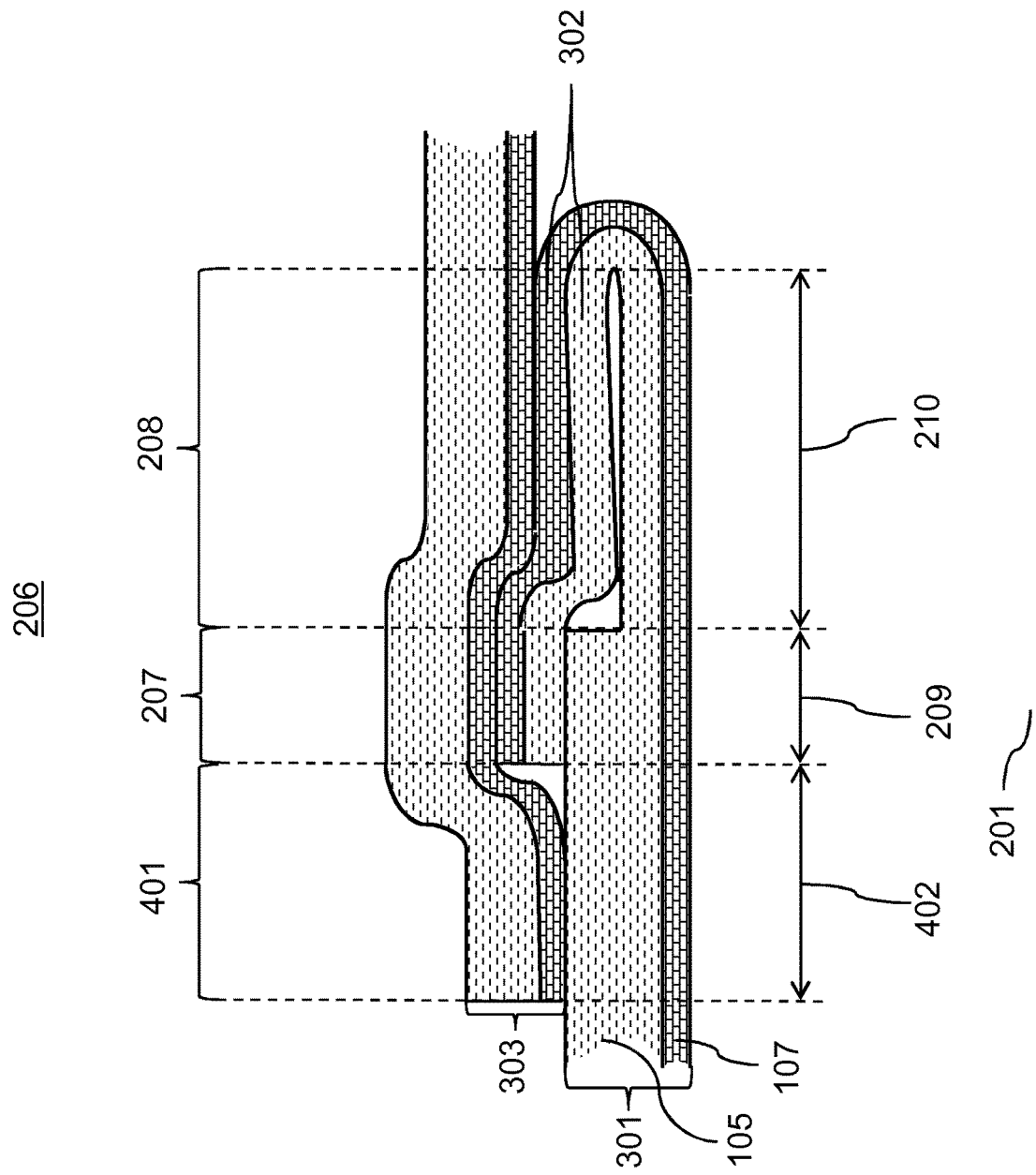
FIG. 4 is a diagrammatic cross section through a longitudinal seam of another container precursor of the invention.

FIG. 4 shows a diagrammatic cross section through a longitudinal seam 206 of another container precursor 200 of the invention. The longitudinal seam 206 here is designed as the longitudinal seam 206 of FIG. 2. However, in FIG. 4 the wall comprises a third wall region 401, having a third width 402 along the circumference 205 of the container precursor 200 of 5 mm. The third wall region 401 partly comprises as a layer sequence from the interior 201 outwards the first ply 301 and the third ply 303, in each case of the sheetlike composite; wherein in the third wall region 303 the first ply 301 is heat-sealed via the outer polymer layer 103 in the first ply and the inner polymer layer 109 in the third ply 303. The third wall region 401 abuts against the first wall region 207. In the second wall region 208, the first ply 301 and the second ply 302 are in contact, but not sealed to each other. The structure of the longitudinal seam 206 shown in FIG. 4 corresponds to example 4 above.

FIGS. 5a) to f) show an illustration of producing a longitudinal seam 206 of a container precursor 200 of the invention. Therein, the subfigures a) to f) show a chronological sequence of events. The sheetlike composite 100 used is the one shown in FIG. 1. However, for the sake of simplicity only the carrier layer 105 and the barrier layer 107 are depicted here. In the FIG. 5b), the carrier layer 105 is skived. In the FIGS. 5c) to e), the sheetlike composite is folded. In the FIG. 5f), the longitudinal seam 206 of FIG. 4 is obtained by sealing plies of the sheetlike composite 100 onto one another.

FIG. 6 shows a diagrammatic view of a closed container 600 of the invention. The closed container 600 can be obtained via folding of the container precursor 200 of FIG. 2 along crease lines 212 and sealing of folded regions to seal the top region 202 and the bottom region 203. Accordingly, the closed container 600 includes the sheetlike composite 100 of FIG. 1 and the longitudinal seam 206 of FIG. 3. The closed container 600 further includes at least 12 edges, 4 of which are longitudinal edges 204. The closed container 600 surrounds an interior which includes a foodstuff 601. The foodstuff 601 can be liquid, but can also include solid constituents. The closed container 600 shown in FIG. 6 is of one-piece design. The closed container 600 can moreover be provided with a fitment to improve ease of opening. Here, the hole 211 in the carrier layer 105 of the sheetlike composite 100 is covered by a cap 602 with an opening aid which is attached to the closed container 600. The closed container 600 is of the so called brick-type which has a cuboid shape.

FIG. 7 shows a diagrammatic cross section through a longitudinal seam 700 of a container precursor not according to the invention. The structure of the longitudinal seam 206 corresponds to comparative example 1. For the sake of simplicity only the carrier layer 105 and the barrier layer 107 of the sheetlike composite 100 are depicted here.

FIG. 8 shows a diagrammatic cross section through a longitudinal seam 206 of a container precursor 200 of the invention. The structure of the longitudinal seam 206 corresponds to example 1. For the sake of simplicity only the carrier layer 105 and the barrier layer 107 of the sheetlike composite 100 are depicted here.

FIG. 9 shows a diagrammatic cross section through a longitudinal seam 700 of a container precursor not according to the invention. The structure of the longitudinal seam 206 corresponds to example 2. The structure of the longitudinal seam 206 corresponds to example 2. For the sake of simplicity only the carrier layer 105 and the barrier layer 107 of the sheetlike composite 100 are depicted here.

FIG. 10 shows a diagrammatic cross section through a longitudinal seam 700 of a container precursor not according to the invention. The structure of the longitudinal seam 206 corresponds to comparative example 2. For the sake of simplicity only the carrier layer 105 and the barrier layer 107 of the sheetlike composite 100 are depicted here.

LIST OF REFERENCE NUMERALS 100 sheetlike composite
101 outer surface
102 inner surface
103 outer polymer layer
104 colour application
105 carrier layer
106 intermediate polymer layer
107 barrier layer
108 adhesion promoter layer
109 inner polymer layer
200 container precursor of the invention
201 interior
202 top region 203 bottom region
204 longitudinal edge/longitudinal fold
205 circumference
206 longitudinal seam
207 first wall region
208 second wall region
209 first width
210 second width
211 hole
212 crease line
301 first ply
302 second ply
303 third ply
401 third wall region
402 third width
600 closed container of the invention
601 foodstuff
602 cap with opening aid

The invention claimed is:

1. A container precursor, comprising a composite sheet;
wherein the composite sheet comprises as a layer sequence in a direction from an outer surface of the composite sheet to an inner surface of the composite sheet:
a) an outer polymer layer,
b) a colour application,
c) a carrier layer, and
d) a barrier layer;
wherein the composite sheet forms a wall of the container precursor;
wherein the wall
a. at least partly surrounds an interior of the container precursor, and
b. comprises a first wall region and a second wall region;
wherein the first wall region partly comprises as a layer sequence from the interior outwards a first ply, a second ply, and a third ply, in each case of the composite sheet;
wherein in the first wall region the first ply is bonded to the second ply and the second ply is bonded to the third ply;
wherein the second wall region partly comprises as a layer sequence from the interior outwards the first ply, the second ply, and the third ply, in each case of the composite sheet;
wherein in the second wall region the second ply is bonded to the third ply;
wherein at least the carrier layer and the barrier layer extend into the first ply, the second ply, and the third ply;
wherein in the first wall region: in the second ply a layer thickness of the carrier layer is less than in the first ply, or in the third ply, or in both;
wherein in the second wall region: in the third ply a layer thickness of the carrier layer is more than in the first ply, or in the second ply, or in both;
wherein the colour application comprises one or more colourants in a total proportion of 1 to 60% by weight, based on the weight of colour application.

2. The container precursor according to claim 1, wherein the first wall region abuts against the second wall region.

3. The container precursor according to claim 1, wherein in the first wall region: the layer thickness of the carrier layer in the second ply is 0.05 to 0.9 times the layer thickness of the carrier layer in the first ply, or in the third ply, or in both.

4. The container precursor according to claim 1, wherein in the second wall region: the layer thickness of the carrier layer in the third ply is 1.1 to 20 times the layer thickness of the carrier layer in the first ply, or in the second ply, or in both.

5. The container precursor according to claim 1, wherein the wall comprises a third wall region;
wherein the third wall region partly comprises as a layer sequence from the interior outwards the first ply, and the third ply, in each case of the composite sheet;
wherein in the third wall region the first ply is bonded to the third ply;
wherein the third wall region abuts against the first wall region.

6. The container precursor according to claim 1, wherein the outer polymer layer is an outermost layer of the composite sheet.

7. The container precursor according to claim 1, wherein the colour application adjoins the carrier layer.

8. The container precursor according to claim 1, wherein the colour application comprises at least 4 wt.-% of at least one colourant, based on the weight of the colour application.

9. The container precursor according to claim 1, wherein the outer polymer layer comprises at least 50 wt.-% of a polyethylene, based on the weight of the outer polymer layer.

10. The container precursor according to claim 1, wherein the first wall region and the second wall region each are comprised by a longitudinal seam of the container precursor.

11. A closed container, obtainable from the container precursor according to claim 1.

12. A closed container, comprising a composite sheet;
wherein the composite sheet comprises as a layer sequence in a direction from an outer surface of the composite sheet to an inner surface of the composite sheet:
a) an outer polymer layer,
b) a colour application,
c) a carrier layer, and
d) a barrier layer;
wherein the composite sheet forms a wall of the closed container;
wherein the wall
a. at least partly surrounds an interior of the closed container, and
b. comprises a first wall region and a second wall region;
wherein the first wall region partly comprises as a layer sequence from the interior outwards a first ply, a second ply, and a third ply, in each case of the composite sheet;
wherein in the first wall region the first ply is bonded to the second ply and the second ply is bonded to the third ply;
wherein the second wall region partly comprises as a layer sequence from the interior outwards the first ply, the second ply, and the third ply, in each case of the composite sheet;
wherein in the second wall region the second ply is bonded to the third ply;
wherein at least the carrier layer and the barrier layer extend into the first ply, the second ply, and the third ply;
wherein in the first wall region: in the second ply a layer thickness of the carrier layer is less than in the first ply, or in the third ply, or in both;
wherein in the second wall region: in the third ply a layer thickness of the carrier layer is more than in the first ply, or in the second ply, or in both;

wherein the colour application comprises one or more colourants in a total proportion of 1 to 60% by weight, based on the weight of colour application.

\* \* \* \* \*